US012427719B1

(12) United States Patent
Williams

(10) Patent No.: US 12,427,719 B1
(45) Date of Patent: Sep. 30, 2025

(54) DIGITAL MANUFACTURING DEVICE OPERABLE IN ADDITIVE OR SUBTRACTIVE MANUFACTURING MODES USING SELECTABLE MATERIALS

(71) Applicant: Antonio St. Clair Lloyd Williams, Concord, CA (US)

(72) Inventor: Antonio St. Clair Lloyd Williams, Concord, CA (US)

( * ) Notice: Subject to any disclaimer, the term of this patent is extended or adjusted under 35 U.S.C. 154(b) by 0 days.

(21) Appl. No.: 17/874,264

(22) Filed: Jul. 26, 2022

Related U.S. Application Data

(60) Provisional application No. 63/225,955, filed on Jul. 27, 2021.

(51) Int. Cl.
| | |
|---|---|
| *B29C 64/245* | (2017.01) |
| *B29C 64/268* | (2017.01) |
| *B29C 64/386* | (2017.01) |
| *B33Y 30/00* | (2015.01) |
| *B33Y 50/00* | (2015.01) |

(52) U.S. Cl.
CPC .......... *B29C 64/245* (2017.08); *B29C 64/268* (2017.08); *B29C 64/386* (2017.08); *B33Y 30/00* (2014.12); *B33Y 50/00* (2014.12)

(58) Field of Classification Search
CPC ... B29C 64/245; B29C 64/386; B29C 64/268; B29C 64/153; B29C 64/255; B29C 64/295; B33Y 30/00; B33Y 50/00; B33Y 50/02; B33Y 10/00; B22F 12/33
USPC ...................................................... 264/482
See application file for complete search history.

(56) References Cited

U.S. PATENT DOCUMENTS

| | | | |
|---|---|---|---|
| 4,575,330 A | 3/1986 | Hull ....................... | B29D 11/00 |
| | | | 425/174.4 |
| 4,863,538 A | 9/1989 | Deckard ................. | B27N 3/00 |
| | | | 156/62.2 |
| 5,391,841 A * | 2/1995 | Quick ................. | H01L 21/4807 |
| | | | 174/258 |
| 11,465,352 B1 * | 10/2022 | Bircher ................. | B29C 64/135 |
| 2013/0154160 A1 * | 6/2013 | Cooper ................. | B29C 64/135 |
| | | | 425/150 |

(Continued)

FOREIGN PATENT DOCUMENTS

| | | | |
|---|---|---|---|
| CN | 102380711 A | * | 3/2012 |
| CN | 102380711 B | | 8/2014 |

(Continued)

OTHER PUBLICATIONS

Zhao et al., CN 102380711 A, published Mar. 21, 2012, machine translation to English. (Year: 2012).*

(Continued)

*Primary Examiner* — Galen H Hauth
(74) *Attorney, Agent, or Firm* — Adibi IP Group, PC; Amir V. Adibi; Andrew C. Palmer

(57) ABSTRACT

A novel approach to digital manufacturing is disclosed. In one embodiment, a single light source is provided in a single digital manufacturing device that can be configured to fabricate a three-dimensional object from liquid resin materials or configured to fabricate a three-dimensional object from powder or the same device can be configured to etch, cut, or mark a workpiece. The changes in configuration can occur through swapping out the hardware for containing the build material and/or by switching configuration using a computer or a physical switch.

20 Claims, 18 Drawing Sheets

(56) References Cited

U.S. PATENT DOCUMENTS

| | | | | |
|---|---|---|---|---|
| 2014/0339741 | A1* | 11/2014 | Aghababaie | B29C 64/124 |
| | | | | 264/401 |
| 2016/0107234 | A1* | 4/2016 | Craeghs | B22F 10/47 |
| | | | | 264/401 |
| 2018/0222125 | A1* | 8/2018 | Wynne | B29C 64/386 |
| 2022/0219230 | A1* | 7/2022 | Ma | B22F 10/28 |
| 2023/0191543 | A1* | 6/2023 | Feied | B21K 1/46 |
| | | | | 29/33 R |

FOREIGN PATENT DOCUMENTS

| | | | | |
|---|---|---|---|---|
| EP | 3295257 B1 * | 5/2019 | | B23K 26/34 |
| GB | 2538333 A | 11/2016 | | |

OTHER PUBLICATIONS

Zhang et al., "Fundamentals of phase-only liquid crystal on silicon (LCOS) devices", Light: Science & Applications (2014) 3; published Oct. 24, 2014. (Year: 2014).*

* cited by examiner

DIGITAL MANUFACTURING DEVICE OPERABLE IN ADDITIVE OR SUBTRACTIVE MANUFACTURING MODES USING SELECTABLE MATERIALS

CROSS REFERENCE TO RELATED APPLICATIONS

This application claims the benefit under 35 U.S.C. § 119 from U.S. Provisional Patent Application Ser. No. 63/225,955, entitled "Methods And Apparatus For Digital Manufacturing," filed on Jul. 27, 2021, the subject matter of which is incorporated herein by reference.

TECHNICAL FIELD

The present invention relates generally to manufacturing techniques and processes, and more specifically, to additive and subtractive manufacturing devices.

BACKGROUND INFORMATION

Digital manufacturing involves the use of a computer to control the fabrication of a product using additive or subtractive manufacturing methods. Additive manufacturing (or three-dimensional printing) consists of a wide variety of techniques. These techniques typically involve the use of a computer-aided design (CAD) software to design the object to be fabricated. The CAD software or a different software then slices the object into layers that can be digitally printed using an additive manufacturing device. The additive manufacturing device typically prints one cross-sectional layer at a time, with each cross-sectional layer being attached to the previously printed cross-sectional layer. Once all cross-sectional layers are printed and bonded to each other, the result is a physical object that is representative of the object that was designed in CAD. There are also computer-controlled subtractive manufacturing techniques. Examples include computer-controlled devices that can etch, cut, or mark a workpiece using two-dimensional data from a computer.

SUMMARY

A novel approach to multi-technique digital manufacturing is disclosed. In one embodiment, a single light source is provided in a single additive manufacturing device that can be used to fabricate a three-dimensional object from liquid resin materials or from powder. An additive manufacturing process is disclosed where the fabrication device or apparatus can be configured to create a three-dimensional object using a powder by using a tray that is designed for selective laser sintering (SLS). The same apparatus can also be configured to fabricate a three-dimensional object using a photo-curable resin by simply swapping out the SLS tray for a vat designed for stereolithography (SLA) and/or activating a switch (physically or by software) that changes the apparatus print process parameters to SLA printing. In addition to printing three-dimensional objects, the same apparatus can be configured to engrave, mark, or cut a two-dimensional object made of metal, wood, plastics, and the like simply by swapping out the SLS tray or SLA vat and swapping in a plate designed for engraving, cutting or marking (ECM) and/or activating a switch (physically or by software) that changes the printing process parameters to ECM printing. In an embodiment, a single tray is provided that supports all manufacturing types disclosed herein without needing to be swapped out when switching between manufacturing modes.

In one embodiment, the apparatus includes a light source (for example, a laser) that emits a beam of light in the visible wavelength (e.g. blue wavelength on the order of 450 nanometers). The emitted beam is directed to a transparent window at the bottom of the SLS tray, through which the beam can focus on a spot on the powder side of the transparent window to fuse the powder that resides at that location in the tray given that there is sufficient laser power and laser dwell time to do so (e.g. greater than 1 watt of laser power). The choice of materials for the transparent window should be such that the visible light wavelength can pass through (e.g.—borosilicate glass, fused silica, etc.). The emitted beam motion and position on the powder side of the transparent window is controlled and modulated using an emitted beam positioning or steering system that is controlled by a computer or similar device. An example of an emitted beam positioning or steering system is a laser galvanometer that, in one example, includes optical lenses as well as fixed and motorized mirrors actuated by motors or similar devices. For simplicity, throughout this disclosure the galvanometer is used as an example of a device that can move, position, and focus the emitted beam (e.g., laser) onto the top of the transparent window. However, there are other technologies such as raster output scanners or a motorized 2-axis gantry system that can do a similar function. Such devices should be considered to be part of this disclosure.

The computer or similar device that controls the location and motion of the emitted beam spot on the powder side of the transparent window uses the data from the two-dimensional cross-sectional layer of the three-dimensional object that was created using CAD or similar software. During the fabrication of each cross-sectional layer of the object, said cross-sectional layer is fused to the prior cross-sectional layer. After an image is fused into each cross-sectional layer, the fused cross-sectional layer displaces a sufficient distance to allow a powder-recoating mechanism to replenish and level the layer of the powder that resides on the SLS tray transparent window. The fused cross-sectional layer then moves back into a position to ensure that there is a one-layer thick gap on the powder side of the transparent window. This process repeats until the full three-dimensional object is fabricated.

The apparatus described in this first embodiment can then be configured to also fabricate an object using photo-curable resin that is curable using the same visible wavelength-emitting beam source that is used for selective laser sintering (e.g. 450 nanometers wavelength lasers). To do so, the SLS tray is replaced by the SLA vat. Like the SLS tray, the SLA vat also has a transparent window. However, a visible wavelength light photo-curable resin such as that which was disclosed in UK Patent GB 2538333A is placed inside the SLA vat. The three-dimensional object made from the visible photo-curable resin is then fabricated using the layer-by-layer process described for fabricating the three-dimensional object made from SLS powder.

The same apparatus described in the first embodiment can also be configured to engrave, mark, or cut a two-dimensional object by simply swapping the SLA vat or SLS tray for the ECM plate. The ECM plate may or may not have a transparent window. It is designed to hold the material or workpiece in place while the same visible light emitted beam is used to etch, mark, or cut the workpiece. The same computer or similar device used for SLS and SLA fabrication can be used to control the laser to create a two-dimensional image on the workpiece. The workpiece can be made of a wide range of materials so long as the laser power, dwell time, and number of passes is modulated appropriately based on the work objective. For example, marking on a piece of paper substrate coated with an appropriate thermochromic ink may require less laser power than engraving a plastic workpiece or cutting a wooden workpiece. The choice of workpiece materials, laser power, and dwell time settings are known by those skilled in the art of laser engraving, marking, and cutting.

The apparatus disclosed in this embodiment can have an enclosure that acts to block light entering or leaving the workspace while the SLS, SLA, or ECM fabrication is occurring. In addition, the apparatus may include exhaust vents with filters to exhaust waste or contaminants from the workspace. The apparatus may also include a heater to preheat the SLS powder or SLA resin or the ECM workpiece. Furthermore, the apparatus of this first embodiment can include an air blower or vacuum to remove residual powder from three-dimensional objects fabricated using the SLS technique or from the workpiece fabricated using the ECM configuration.

In another embodiment, the apparatus includes a light source for example a laser that emits a beam of light in the infrared wavelength (e.g., wavelength approximately of 1 micron to 11 microns). Again, the emitted beam is directed to a transparent window at the bottom of the SLS tray, through which the beam can focus on a spot on the powder side of the transparent window to fuse the powder that resides at that spot in the tray given that there is sufficient laser power and laser dwell time to do so (e.g., a 5-watt near infrared diode laser or a 10-watt CO2 laser). The choice of materials for the transparent window should be such that the infrared wavelength light can pass through (e.g.—Zinc Selenide (ZnSe), Potassium Bromide (Kbr), Germanium (Ge), etc.). The emitted beam motion and position on the powder side of the transparent window is controlled and modulated using an emitted beam positioning or steering system that is controlled by a computer or similar device.

Like the first embodiment, an example emitted beam positioning or steering system is a laser galvanometer involving one or more of optical lenses, fixed and motorized mirrors actuated by motors, or similar devices. The choice of optical lens and mirror material should be appropriate for the higher-power laser and the type of infrared wavelength selected. The computer or similar device that controls the location and motion of the emitted beam spot on the powder side of the transparent window uses data from the two-dimensional cross-sectional layer of the three-dimensional object that was created using CAD or similar software. During the fabrication of each cross-sectional layer of the object, said cross-sectional layer is fused to the prior cross-sectional layer. After an image is fused into each cross-sectional layer, the fused cross-sectional layer displaces a sufficient distance to allow a powder-recoating mechanism to replenish and level the layer of the powder that resides on the SLS tray transparent window. The fused cross-sectional layer then moves back into a position to ensure that there is a one-layer thick gap with the powder side of the transparent window. This process repeats until the full three-dimensional object is created.

As with the first embodiment, the apparatus described in this second embodiment can then be configured to also fabricate an object using photo-curable resin. However, compared to the first embodiment, this embodiment has a wavelength converter device that converts the IR wavelength to UV wavelength or visible light wavelength. An example of such a wavelength conversion mechanism is the use of a wavelength crystal. The wavelength conversion device can be switched on or off depending on the configuration. For the photo-curable resin configuration, the wavelength converter is switched on when the apparatus detects that the SLA vat is installed. Once the wavelength converter is switched on, a UV or visible wavelength laser beam is projected through the transparent window in the SLA vat and cures the photo-curable liquid resin. A three-dimensional object made from the photo-curable resin is then fabricated using the layer-by-layer process described for fabricating the three-dimensional object made from the SLS powder.

The same apparatus described in this infrared laser embodiment can also be configured to engrave, mark, or cut a two-dimensional object by simply swapping the SLA vat or SLS tray for the ECM plate. The ECM plate may or may not have a transparent window. As in the first embodiment, the ECM plate is designed to hold the material or workpiece to be etched, cut, or marked in place while the same emitted beam is used to etch, cut, or mark the workpiece. The same computer or similar device used for SLS and SLA fabrication can be used to control the laser to create a two-dimensional image on the workpiece. As with the first embodiment, the choice of workpiece materials, laser power and dwell time settings are known by those skilled in the art of laser engraving, cutting, and marking.

The apparatus disclosed in this embodiment can have an enclosure that acts to block light entering or leaving the workspace while the SLS, SLA, or ECM fabrication is occurring. In addition, the apparatus may include exhaust vents with filters to exhaust waste or contaminants from the workspace. The apparatus may also include a heater to preheat the SLS powder or SLA resin or the ECM workpiece. Furthermore, the apparatus of this second embodiment can include an air blower or vacuum to remove residual powder from three-dimensional objects fabricated using the SLS technique or from the workpiece fabricated using the ECM configuration. A benefit of using an infrared light source is that the laser power typically is much higher than those used for UV or visible light lasers. Thus, the productivity of this embodiment can be significantly greater. In addition, CO2 lasers can process a wider range of materials, i.e., additively manufacture or engrave, cut, or mark more types of materials compared to UV or visible light lasers.

In yet another embodiment, the apparatus includes a light source (e.g., visible or UV light that is diffused and uniformly projected on a light-modulating device such as a liquid crystal display (LCD) panel). The LCD panel enables an image of the cross-sectional layer of the three-dimensional object to be projected onto a transparent window at the bottom of the SLA vat. The two-dimensional light image can focus on the photo-curable resin side of the transparent window to cure the resin at the locations where the light is focused if there is sufficient optical power and dwell time to do so. The choice of materials for the SLA vat transparent window should be such that the UV or visible wavelength light can pass through (e.g., borosilicate glass, fused silica, etc.).

The image formed on the resin side of the transparent window is controlled and modulated by a computer or similar device. The computer or similar device that controls the location and motion of the image focused on the resin side of the transparent window uses the data from the two-dimensional cross-sectional layer of the three-dimensional object that was created using CAD or similar software. During the fabrication of each cross-sectional layer of the object, said cross-sectional layer is fused to the prior cross-sectional layer. After an image is cured into each cross-sectional layer, the cured cross-sectional layer displaces a sufficient distance to allow the resin to flow between the cured resin and resin side of the transparent window. It is possible to include a recoater to level the resin between the fabrication of each cross-sectional layer. In that case, after recoating, the cured cross-sectional layer then moves back into a position to ensure that there is a one-layer thick gap with the resin side of the transparent window. This process repeats until the full three-dimensional object is created.

As with the first two embodiments, the apparatus described in this third embodiment can then be configured to also fabricate an object using powder material. However, to enable fabrication of three-dimensional powder objects, this embodiment uses a device that converts the image projected from the LCD panel into a two-dimensional thermal image that is representative of the geometry of the cross-sectional layer to be fused. The device that converts the optical image into a thermal image is also a novel device and is called an opto electro heater. The temperature profile of the thermal image created using the opto electro heater is sufficient to fuse the powder to create an image in the layer where the temperature is high enough to cure (e.g., 180 Celsius). A three-dimensional object can be made from the powder using the layer-by-layer process described earlier for fabricating the three-dimensional object made from SLA resin. This is because for each layer, the geometry of the thermal image formed by the opto electro heater is the same as that formed on the LCD panel.

The same apparatus described in this third embodiment can be configured to mark a two-dimensional object by simply swapping the liquid resin vat or powder tray for the Marking plate (M plate). The M plate in this case would also have an opto electro heater and this version of the M plate is designed to hold the material or workpiece to be marked in place. The same computer or similar device used for SLS and SLA fabrication can be used to control the LCD panel and opto electro heater system to create a two-dimensional image on the workpiece. The choice of workpiece materials, opto electro heater temperature and dwell time settings can be tuned to optimize the quality of the image created on the workpiece.

The apparatus disclosed in this embodiment can have an enclosure that acts to block light entering or leaving the workspace while the object fabrication or marking is occurring. In addition, the apparatus may include exhaust vents with filters to exhaust waste or contaminants from the workspace within the enclosure. The apparatus may also include a heater to preheat the powder, SLA resin, or marking workpiece. Furthermore, the apparatus of this second embodiment can include an air blower or vacuum to remove residual powder from the three-dimensional objects fabricated using the opto electro heater or from the workpiece fabricated using the marking configuration.

A benefit of this embodiment is that the components are inexpensive compared to the use of high-power lasers. In addition, this technology has the possibility of faster printing speeds because the LCD projects an instant two-dimensional image for each layer, whereas in the other embodiments, a galvanometer is used to create a vector or raster-scanned image in the layer. Vector or raster-scanned image creation is typically slower than an instant two-dimensional LCD image creation. Thus, the productivity of this embodiment can be significantly faster. In addition, the use of an opto electro heater enables the processing of a wider range of materials compared to the first two embodiments, since the material choice is not dependent on the wavelength of the emitted beam being absorbed by the object material.

The novel systems and techniques disclosed provide significant advantages over a variety of existing additive manufacturing techniques. One such technique involves the use of photo-curable resin in a vat where a light source projects or writes an image in a layer of the photo-curable resin. The image written in the photo-curable layer is a two-dimensional image of a cross-sectional layer of the three-dimensional object and can have a range of thicknesses (e.g. 25 microns to 300 microns). When projected onto the photo-curable liquid material, the light source causes the liquid material to change from a liquid state to a solid state in the region of the photo-curable liquid where the light is projected. The result is that a solid material that is representative of a cross-sectional layer of the three-dimensional object is fabricated.

The layer that is now a solid representation of a cross-sectional layer of the three-dimensional object is then displaced a distance that is equivalent to a thickness of a single cross-sectional layer. This action exposes uncured liquid resin to the light source, which then projects an image of the next layer to be fabricated. The newly fabricated cross-sectional layer, which is now a solid representation of the juxtaposed or neighboring cross-sectional layer, is also bonded to the neighboring cross-sectional layer due to the curing nature of the light source. This process continues layer by layer until a three-dimensional object is created.

An example of this layer-by-layer additive manufacturing process using photo-curable materials is disclosed in U.S. Pat. No. 4,575,330 to Hull. FIG. 3 of U.S. Pat. No. 4,575,330 shows a top-down architecture where the light source is above the liquid photo-curable resin, while FIG. 4 of the said patent shows a bottom-up architecture where the light source is below the liquid photo-curable resin. In FIG. 4 of the '330 patent, there is a transparent window that supports the liquid photo-curable resin on one side, through which the light source is projected from below to cure the photo-curable liquid. This photo-curable layer-by-layer additive manufacturing process is called stereolithography (or SLA) and is widely used to fabricate three-dimensional objects. The light source can be an ultraviolet (UV) laser, as disclosed in the '330 patent, or a visible light such as a blue laser (see UK Patent Number GB2538333A). The choice of light source depends on the photo-initiators used in the liquid photo-curable resin.

Following the fabrication of the now-cured three-dimensional object, the object is outside of the vat and the excess liquid photo-curable resin is drained. The printed object is removed, cleaned of residual liquid photo-curable resin, and then optionally placed in a light curing oven for final cure. This final curing ensures that the object achieves its maximum structural strength and that the material properties remain stable over time. Some benefits of SLA are that it is currently one of the most precise additive manufacturing processes, with the end object being high quality with fine detail and smooth surfaces. A disadvantage of SLA is that extra support structures are required to hold up sections of the object to prevent it from collapsing under its weight during the fabrication process. Another disadvantage is that the cured polymer can be weaker than other materials fabricated by conventional means (e.g. injection molding). However, for many applications requiring high detail features and smooth surfaces such as dentistry, jewelry, and prototypes, SLA is quite useful and is therefore widely used.

Another additive manufacturing technique that is widely used involves the use of powder with typical particle size of 20 microns to 70 microns placed in a container where a high-power light source projects or writes an image in a layer of the powder. The image written in the powder layer is a two-dimensional image of a cross-sectional layer of the three-dimensional object and is typically 20 microns to 150 microns thick. When projected onto the powder material, the high-power light source causes the powder particles to sinter or fuse together in the region of the powder where the light is projected. The result is that a solid material that is representative of a cross-sectional layer of the three-dimensional object is fabricated. The layer that is now a solid representation of a cross-sectional layer of the three-dimensional object is then displaced a distance that is equivalent to the thickness of a single cross-sectional layer. This action exposes a fresh powder coat to the light source, which then projects an image of the next layer to be fabricated. The newly fabricated cross-sectional layer, which is now a solid representation of the neighboring cross-sectional layer, is also bonded or fused to the neighboring cross-sectional layer due to the fusing quality of the high-power light source. This process continues layer by layer until a three-dimensional object is created.

An example of this layer-by-layer additive manufacturing process using powder materials is disclosed in U.S. Pat. No. 4,863,538 to Deckard. FIG. 1 of the '538 patent shows a top-down architecture where the light source is above the powder. Chinese Patent Number CN 102380711B discloses a bottom-up architecture where the light source is below the powder. In FIG. 1 of the Chinese '711 patent, there is a transparent window that supports the powder on one side, through which the high-power light source is projected from below to fuse the powder. This fusing of powder layer-by-layer additive manufacturing process is called selective laser sintering (or SLS) and is also widely used to fabricate three-dimensional objects. The light source can be visible or infrared (IR), such as a laser or projected light with a wavelength typically on the spectrum of 450 nanometers to 11 microns. The choice of light source depends on the wavelength that the powder particles can absorb to heat up and fuse.

An advantage of the top-down SLS architecture is that no extra support structures are required because the powder that is not sintered or fused acts as the support for overhung features. This lack of extra support structures for the top-down SLS architecture can enable assemblies of objects that are able to move relative to each other, an example being gear trains. The excess powder that acts as support needs to be cleaned from the object. For existing bottom-up SLS architecture, as disclosed in the Chinese '711 patent, a support structure is required that is akin to stereolithography since the powder that is not fused is unavailable to act as a support. Another advantage of SLS is that the materials are typically stronger than those of SLA. A disadvantage of the top-down SLS architecture is that it can take a long time to warm up the powder before the fabrication of the object can begin. It also takes a long time to cool down the powder before the printed object can be used. This warm-up and cool-down requirement for the top-down SLS architecture also results in a lot of energy use. Another disadvantage of both bottom-up and top-down SLS architectures is that the surface finish of the resulting three-dimensional object can have a rough appearance when compared to SLA. Despite these disadvantages, SLS is still widely used. The higher strength of an SLS-fabricated object is quite useful for functional prototypes and commercially used products.

In addition to SLA and SLS additive manufacturing techniques, there are other techniques including fused deposition modeling, binder jetting, material jetting, among others. Each technique has its advantages and disadvantages, and each is suitable for different applications. To take advantage of the benefits of each additive manufacturing technique requires the purchasing of each type of equipment, which can become quite costly. Attempts have been made to develop multi-technique additive and subtractive manufacturing devices. The issue with such systems is that they are essentially separate additive and sometimes subtractive manufacturing devices that are stitched together to enable the use of multiple digital manufacturing techniques. However, the cost of such systems is usually more expensive than buying the individual digital manufacturing devices because there is additional complexity and costs of integrating such systems. The novel systems and techniques disclosed below overcome various limitations with these existing systems.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention. For example, some embodiments of the present invention are illustrated as an example and are not limited by the figures of the accompanying drawings.

DETAILED DESCRIPTION

Reference will now be made in detail to some embodiments of the invention, examples of which are illustrated in the accompanying drawings.

Figure 1:
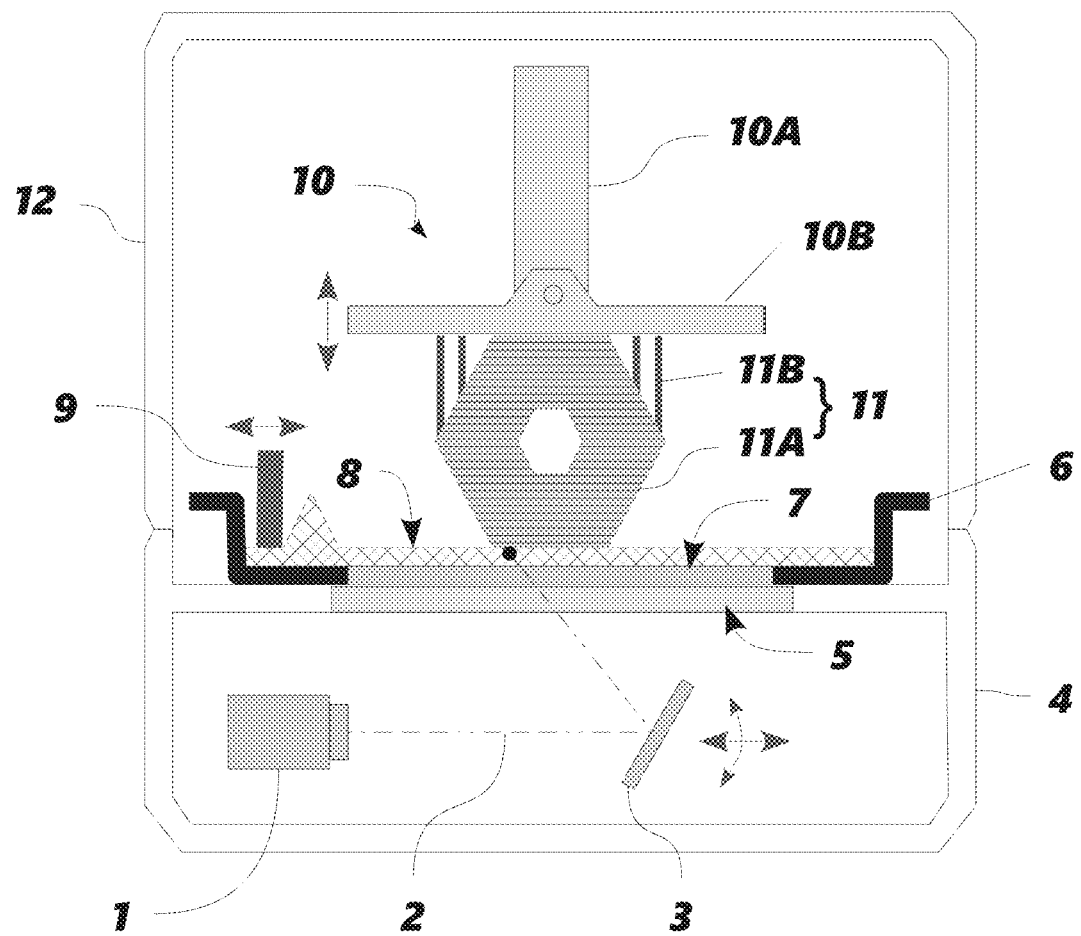
FIG. 1 is a diagram that depicts a digital manufacturing device in accordance with one embodiment having a visible wavelength laser and configured with an SLS tray.

FIG. 1 is a diagram of a digital manufacturing device in accordance with one embodiment. A laser module 1 emits a laser beam 2 with a wavelength within the visible range of 380 nanometers to 700 nanometers. In one example, the laser module 1 emits a specific wavelength on the order of 450 nanometers. In this example, the laser wavelength has a blue color and is visible to the human eye. Such lasers are also readily available with sufficient power for additive or subtractive manufacturing.

Next, the emitted beam 2 then propagates to the galvanometer module 3. Galvanometer module 3 comprises motorized mirrors that, when actuated and controlled by a computer or similar devices (not shown), enables laser beam 2 to propagate through transparent window 5 and then through transparent window 7, where it creates an image of a cross-sectional layer of a three-dimensional object. The laser beam 2 is focused on a powder side of the transparent window 7. As depicted in FIG. 1, the laser module 1 and galvanometer 3 are housed in an enclosure 4 with a top surface that comprises transparent window 5. Transparent window 5 is optional, but if utilized can serve to prevent contaminants from entering a portion of enclosure 4 that houses the optical elements of the laser module 1 and galvanometer 3.

Continuing with FIG. 1, digital manufacturing device comprises a removable tray 6 referred to as the selective laser sintering tray (or SLS tray). SLS tray 6 comprises transparent window 7 and is designed to contain powder 8. Powder 8 could be a range of materials in powdered form that can be sintered to create a solid object. For example, the material used for powder 8 is a plastic (e.g. nylon), a metal, or ceramic powder composite specifically designed for selective laser sintering. The powder 8 is able to absorb the laser energy being emitted from laser module 1. By absorbing the light energy, the powder 8 can sinter or melt given sufficient laser power and dwell time. The laser module 1 can be on the order of 1 watt or greater. The amount of laser power can be less if the laser beam 2 that is focused on the powder 8 has sufficient time to heat up the powder. However, this could result in slower fabrication speed of the three-dimensional object. In order to fabricate the three-dimensional object, a thin layer of powder 8 with a layer thickness on the order of 100 microns is spread on top of the transparent window 7 using a coating mechanism 9 (sometimes called a recoater).

After a first layer of powder 8 is deposited on top of transparent window 7, build platform 10 is translated vertically downwards until a bottom of a build plate 10B is in contact with a top of the first layer of the powder 8. For simplicity, throughout this document the build platform 10 is described as moving in the vertical direction away and towards the transparent window 7. However, it is also possible to design a system where the build platform 10 is fixed and the transparent window 7, along with optical elements such as lenses, lasers, galvanometers, etc., each move relative to the build platform 10.

Once the build plate 10B is on top of the layer of powder 8, the bottom of build plate 10B will have approximately a one-layer thickness (e.g., 100 microns to the top of transparent window 7). At this point in the fabrication process, laser module 1 and galvanometer 3 controlled by a computer or similar device scans an image into the top of the layer of powder 8 that resides between the bottom of build plate 10B and the top of transparent window 7. During the scanning of the image onto the layer of powder 8, sufficient thermal energy is generated to sinter, fuse, or melt the powder 8 because the powder 8 can absorb the energy from laser beam 2. The result is a solid representation of the first cross-sectional layer of the three-dimensional object 11. As described in earlier sections of this document, the geometry of the now fused or sintered cross-sectional layer is created using a computer software that slices the three-dimensional geometry into layers. The first cross-sectional layer is also fused or attached to the bottom of build plate 10B.

The next step in this additive manufacturing process is that the build platform 10 with translation mechanism 10A moves vertically away from the top of transparent window 7. This translation action results in this first cross-sectional layer of the three-dimensional object 11 that is now a solid layer moving away from the top of transparent window 7, supported by sintered powder 11B. It is common practice in additive manufacturing devices such as bottom-up stereolithography architecture to have the surface of the transparent window 7 that is in contact with the build material to have a non-stick coating. Alternatively, the transparent window 7 is fabricated out of a material that has low surface energy (e.g., fluorinated ethylene propylene, or FEP). It is also common practice in stereolithography for the bottom of the build plate 10B to have a high surface energy so that the first cross-sectional layer of the three-dimensional object 11 can adhere to the bottom of build plate 10B.

Typically, the build plate 10B is fabricated out of a metal such as aluminum, although this is not required. The surface energy of aluminum is sufficient to adhere the first cross-sectional layer of the three-dimensional object 11 to the bottom of the build plate 10B. Leveraging this practice, the present embodiment also has a build plate 10B with the bottom having a surface energy that is higher than the top of transparent window 7. This difference in surface energy will enable the now-fused powder that is the first cross-sectional layer of the three-dimensional object 11 to remain attached to the bottom of the build plate 10B and separate from the top of transparent window 7.

Another technique commonly used in bottom-up stereolithography to separate the cured or solid layer from the top of the transparent window 7 is to add a mechanism that allows the transparent window 7 to pivot away from the now solid cross-sectional layer of the three-dimensional object 11. This pivoting action of the transparent window 7 results in the transparent window 7 peeling away from the now solid cross-sectional layer of the three-dimensional object 11. The next step in the process is to have the bottom of the build plate 10B move a sufficient distance away from the top of transparent window 7 to allow the recoater 9 to deposit a fresh layer of powder 8 on top of the transparent window 7. Once the recoating process is complete and there is now a replenished layer of powder 8 on top of transparent window 7 and the thickness of this layer is on the order of 100 microns (can be less or more), then the build platform translation mechanism 10A moves the build plate 10B towards the top of the transparent window 7.

The motion of the build plate 10B is stopped once the bottom of the first cross-sectional layer of the three-dimensional object 11 is in contact with the top of the replenished layer of powder 8. The next step in the process is that the laser module 1 and galvanometer 3, controlled by a computer or similar device, scans an image that is representative of the second cross-sectional layer of the three-dimensional object 11 into the layer of powder 8 that resides between the bottom of the first cross-sectional layer of three-dimensional object 11 and the top of transparent window 7. As before, during the scanning of the image into the layer of powder 8, sufficient thermal energy is generated to sinter, fuse, or melt the powder 8 because the powder 8 can absorb the energy from laser beam 2. The result is a solid representation of the second cross-sectional layer of the three-dimensional object 11. This second cross-sectional layer also attaches to the first cross-sectional layer since there is sufficient thermal energy generated to fuse or melt the replenished layer of powder 8 to the bottom of the first cross-sectional layer of three-dimensional object 11. The sequence of moving the build plate 10B away from the top of transparent window 7, replenishing the powder 8 with a thickness equivalent to one cross-sectional layer of the three-dimensional object 11, then fusing an image of a cross-sectional layer of the three-dimensional object 11 onto a layer of powder 8 using the computer-controlled laser module 1 and galvanometer 3, and finally moving the build plate 10B away from the transparent window 7 repeats until all cross-sectional layers of the three-dimensional object 11 are fabricated and fused together. The result is the creation of a solid three-dimensional object 11 made from fused, sintered, or melted powder particles.

The next step in the process is to remove the three-dimensional object 11 from the build plate 10B. Here, a process similar to what is commonly done in bottom-up stereolithography architecture can be used to scrape or peel away the top of the three-dimensional object 11 from the bottom of build plate 10B using tools such as a scraper or by hand. Note that to access the three-dimensional object 11 and build platform 10, it may be necessary to remove or open top enclosure 12.

The top enclosure 12 can be constructed with materials that are opaque to the light emitted from laser module 1, such as plastics, metals, or organic materials such as wood. It is possible to select an enclosure material that allows the operator to observe the additive fabrication of three-dimensional object 11. This can be accomplished by having a safety window with sufficient optical density rating to prevent damage to the human eye (e.g., an optical density rating of 7). Another option is to have the top enclosure 12 be made from a completely opaque material such as aluminum and then place a camera inside the enclosure to observe the additive fabrication of the three-dimensional object 11. Besides a visible light camera, other sensors could be used to observe the additive manufacturing build process. Examples of such sensors include thermal imaging sensors, thermocouples, thermistors, and ultrasonic or laser-scanning sensors that sense a three-dimensional image of the three-dimensional object being created. The sensor(s) could be placed in top enclosure 12 or bottom enclosure 4 depending on the part of the fabrication process that is being monitored.

The information acquired from sensing the fabrication process can be used to correct any defects or failures that may occur during the additive manufacturing fabrication process. Top enclosure 12 and/or bottom enclosure 4 may contain a thermal heating device to preheat the layer of powder 8 to a temperature just below the melting point of the powder 8. For example, if the melting point of the powder 8 is 180° C., then one may wish to uniformly preheat the layer of powder 8 to 170° C. Preheating of the powder 8 allows the use of less laser power and/or dwell time to melt the powder 8. This can increase the speed at which the laser module 1 and galvanometer 3 can fuse the image into the layer of powder 8. The practice of preheating the powder 8 is common in top-down selective laser sintering SLS architecture. However, top-down selective laser sintering SLS architecture consumes a significant amount of time (e.g. one hour or more) to preheat and eventually cool down the powder 8 to a temperature below the melting point because one needs to preheat an entire container of powder. On the other hand, in the bottom-up SLS architecture depicted in the novel embodiment shown in FIG. 1, much less time is needed to preheat the powder 8 (measured in seconds) since one need only to preheat a single layer of powder 8.

FIG. 1 also shows that three-dimensional object 11 contains features 11A and 11B. Feature 11A is the useful portion of the object being manufactured, while feature 11B is the temporary support structure. The use of support structures is common in stereolithography architectures. The support structures are in place to prevent the distortion of feature 11A when the build platform 10 is in motion during the additive manufacturing process. Without a support structure, distortion occurs because of gravity, thermal, or pull forces acting on an unsupported object. The support structures 11B can be removed after three-dimensional object 11 is removed from the build plate 10B. There may be loose powder particles attached to the three-dimensional object 11. The loose powder particles can be removed using an air blower, air-knife, brush, or similar devices that are located inside the upper enclosure 12 and are automated using a computer control device (not shown) during or at the end of the additive manufacturing process described earlier.

Figure 2:
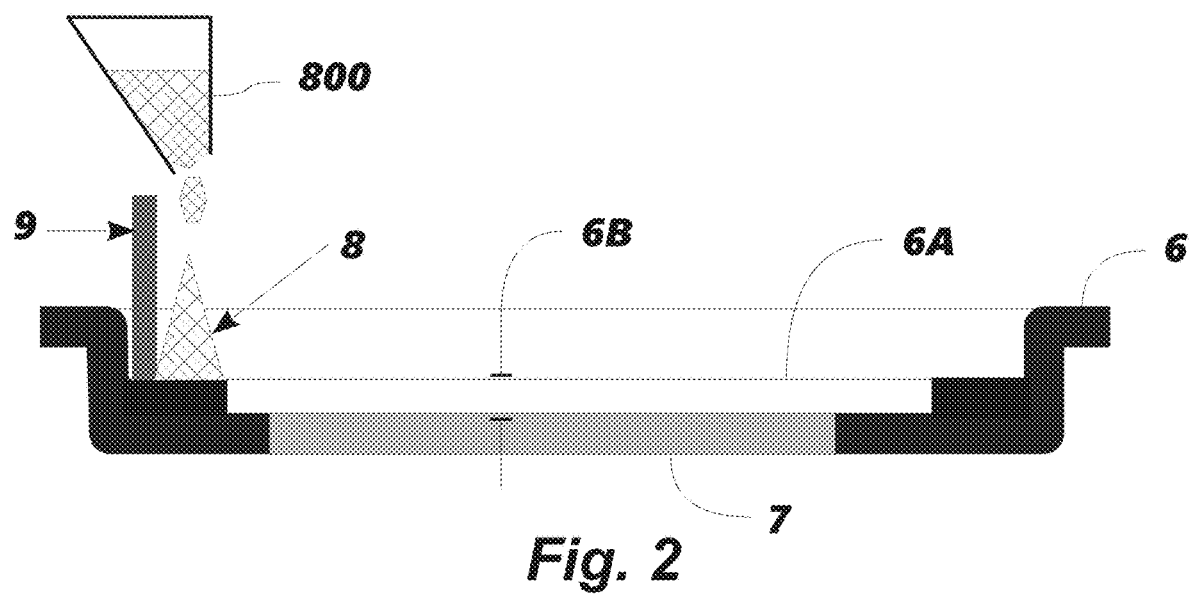
FIG. 2 is a diagram that depicts a schematic cross-section of the SLS tray being loaded with powder and shows a recess feature that controls the powder layer thickness.

FIG. 2 is a diagram showing a removable SLS tray 6 being loaded with powder 8 using a powder feeder mechanism 800. The powder feeder mechanism 800 may or may not be required. It depends on how much powder is needed to fabricate the three-dimensional object 11. If more powder is needed than what already exists in SLS tray 6, then powder feeder 8 will open a valve or similar device to deposit sufficient powder into SLS tray 6. FIG. 2 also depicts a feature 6B and surface 6A. Feature 6B has a dimension in the vertical direction equivalent to a one-layer thickness of a cross-sectional layer of the object to be fabricated. For example, the vertical dimension or thickness of feature 6B could be on the order of 100 microns. The vertical dimension or thickness of feature 6B could be fixed or adjustable manually or by automation. Note that feature 6B is a recessed area from surface 6A to the top of transparent window 7.

Figure 3:
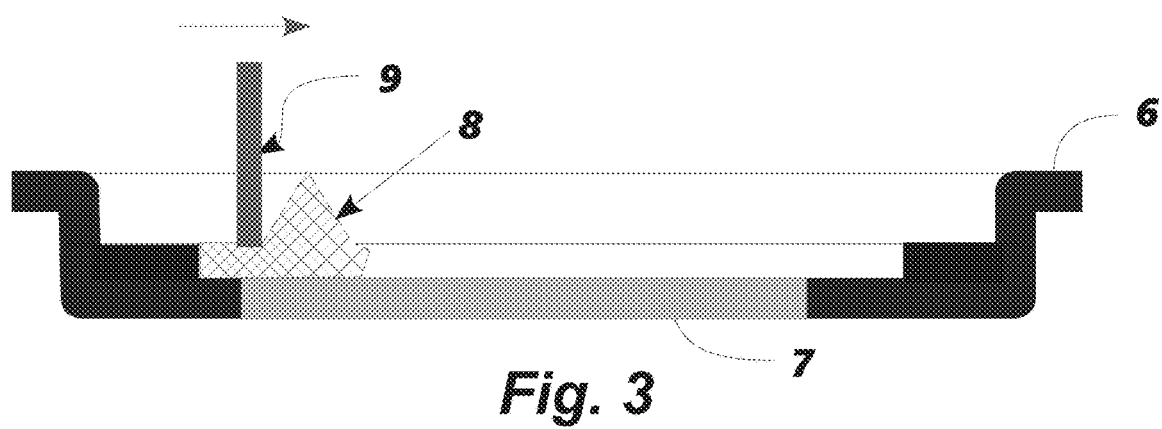
FIG. 3 is a diagram that depicts the SLS tray with the recoater blade laying down a uniform single layer coating of the SLS powder.

FIG. 3 is a diagram showing the motion of the recoater mechanism 7 as it pushes the powder 8 into the recessed feature 6B. The recoater blade 9 depicted in FIG. 2 uniformly coats the top of the transparent window 7 as the recoater blade 9 moves in the direction indicated by the arrow. A consistent powder coating thickness equivalent to distance 6B can be achieved by forcing the recoater blade mechanism 9 to be always in contact with surface 6A. At the end of the travel of the blade mechanism (e.g., from the left side to the right side of SLS tray 6), the blade can travel the opposite direction (right to left) during the next powder-coating cycle. This process can continue until the fabrication of three-dimensional object 11 is complete.

In the example of FIG. 3, the recoater mechanism 9 moves to the right. The recoater mechanism 9 and powder feeder 800 could also start from the left. Note also that an optional embodiment is to have the powder feeder mechanism 800 move in concert with the recoater mechanism 9 to always be ready to supply powder 8 to the SLS tray 6.

Figure 4:
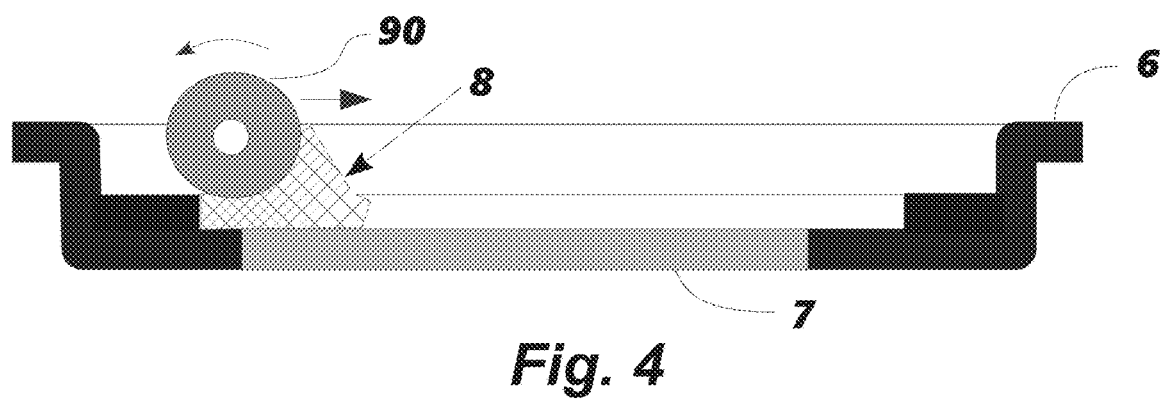
FIG. 4 is a diagram that shows the SLS tray with an alternative recoater roller laying down a uniform single layer coating of the SLS powder.

FIG. 4 is a diagram showing another type of recoater mechanism that uses a roller 90 that can rotate clockwise or counterclockwise and translate in the corresponding direction as shown. The function of the roller mechanism 90 is to enable a uniform powder coating thickness between surface 6A and the top of transparent window 7. The recoater mechanisms 9, roller 90, or other types of powder recoater mechanisms can be attached to the SLS tray 6. Alternatively, the recoater mechanism(s) could be a separate mechanism(s) that is part of the structure of the additive manufacturing apparatus depicted in FIG. 1.

Figure 5:
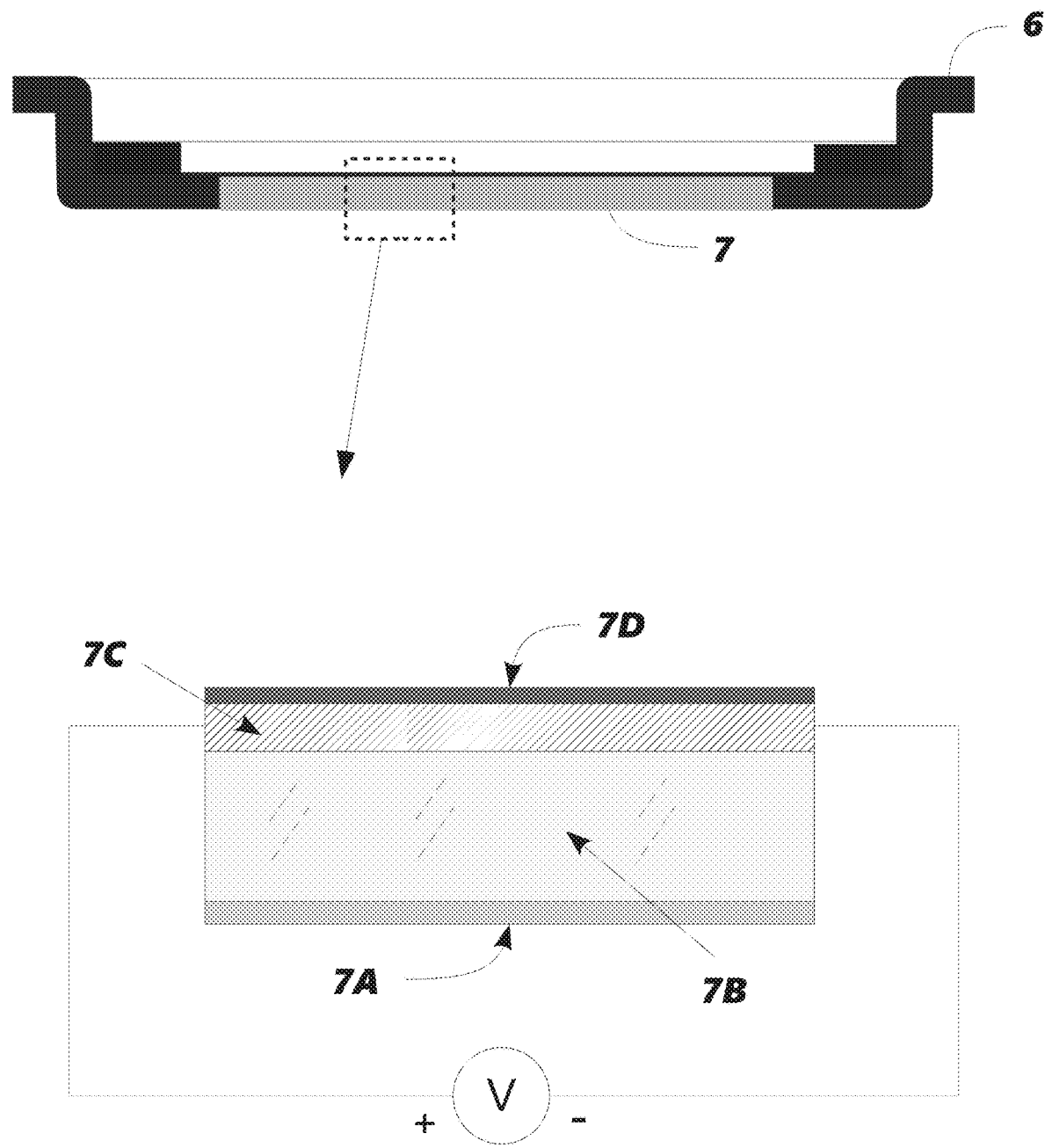
FIG. 5 is a diagram of a cross-sectional view of the transparent window for the SLS tray.

FIG. 5 is a diagram showing transparent window 7 in accordance with one embodiment. In the cross-sectional view, the transparent window 7 comprises an anti-reflection (AR) coating 7A. The AR coating 7A is designed to maximize the amount of laser energy 2 that is transmitted through the transparent member 7B. It does so by reducing the amount of laser light 2 that is reflected away from the transparent window 7. An example of an AR coating material is Magnesium Fluoride (MgF2). Examples of materials that transparent member 7B can be manufactured from include borosilicate glass, fused silica, etc. The embodiment of the transparent window 7 shown in FIG. 5 shows an electrically conductive and optically transparent layer 7C. Layer 7C can be made of transparent conducting oxides (TCO), such as indium tin oxide (ITO), aluminum doped zinc oxide (AZO), Indium-doped cadmium oxide (ICO), etc. Layer 7C can also be made from transparent conducting polymers that are derivatives of polyacetylene, polyaniline, etc., or thin films of carbon nanotubes (CNT). The choice of material for layer 7C depends on the wavelength of the laser beam 2, the maximum temperature required to fuse or melt the powder 8, and the amount of transparency required.

One function of the transparent conductive layer 7C is to enable a static positive or negative charge to be generated on the top surface of transparent window 7. A charge that is opposite that of the top surface of the transparent conductive window 7 can be applied to powder 8 to allow the powder 8 to be attracted to the transparent window 7. This can be helpful during the powder recoating steps described previously by increasing the sticking force of the powder 8 to the top surface of transparent window 7, thus minimizing slipping of the powder 8 as the powder 8 is dragged along by the recoater mechanism 9 or 90. Bulk slipping of powder 8 can result in non-uniform coating of the layer of powder 8 on top of transparent window 7. This is the case if the top surface of the transparent window 7 has a low-surface energy permanent or temporary non-stick coating, or if the orientation of the apparatus and the transparent window 7 is upside down or sideways or tilted otherwise. During the fused powder layer separation or peeling step described earlier, the charge on the transparent conductive layer 7C is reversed so that it repels the powder 8 (fused and loose) from the top surface of the transparent window 7. To enable the charging of the transparent conductive layer 7C, a voltage can be applied as indicated in FIG. 5.

Another function of the transparent conductive layer 7C is to act as a thermal preheater in whole or in part for the powder 8. As described earlier, preheating can increase the fabrication speed of the image that is fused into powder 8 using laser module 1 and galvanometer 3 or a similar device. The transparent conductive layer 7C could also be made of partitioned heating zones that can be individually actuated so as to heat only the region of the powder that will be exposed to laser energy. Also depicted in FIG. 5 is an optional non-stick coating layer 7D that can be permanently bonded as shown. The non-stick coating 7D should be transparent to the wavelength of the emitted beam 2. An example of non-stick coating material is a silicon-oxygen-carbon (carboxy silicon) that can be applied to the transparent window surface using a chemical vapor deposition process. The function of layer 7D is to help with the separation of the fused powder 8 from the top of the transparent window 7 during the additive fabrication of the three-dimensional object 11 as described previously. The transparent window 7 shown in FIG. 5 can be fabricated using various means, an example being microfabrication.

Going back to FIG. 1, the three-dimensional object 11 has a support structure 11B that is similar to support structures commonly used in stereolithography architectures. However, in conventional top-down selective laser sintering architecture, the loose powder that is not fused acts as support structure throughout the build cycle. A benefit of using the loose powder as a support structure is that one does not need to cut off the support structure legs 11B and dispose of it. Instead, you can simply remove the loose powder that is acting as a support in conventional top-down selective laser sintering with an air blower or by shaking the three-dimensional object.

Figure 6:
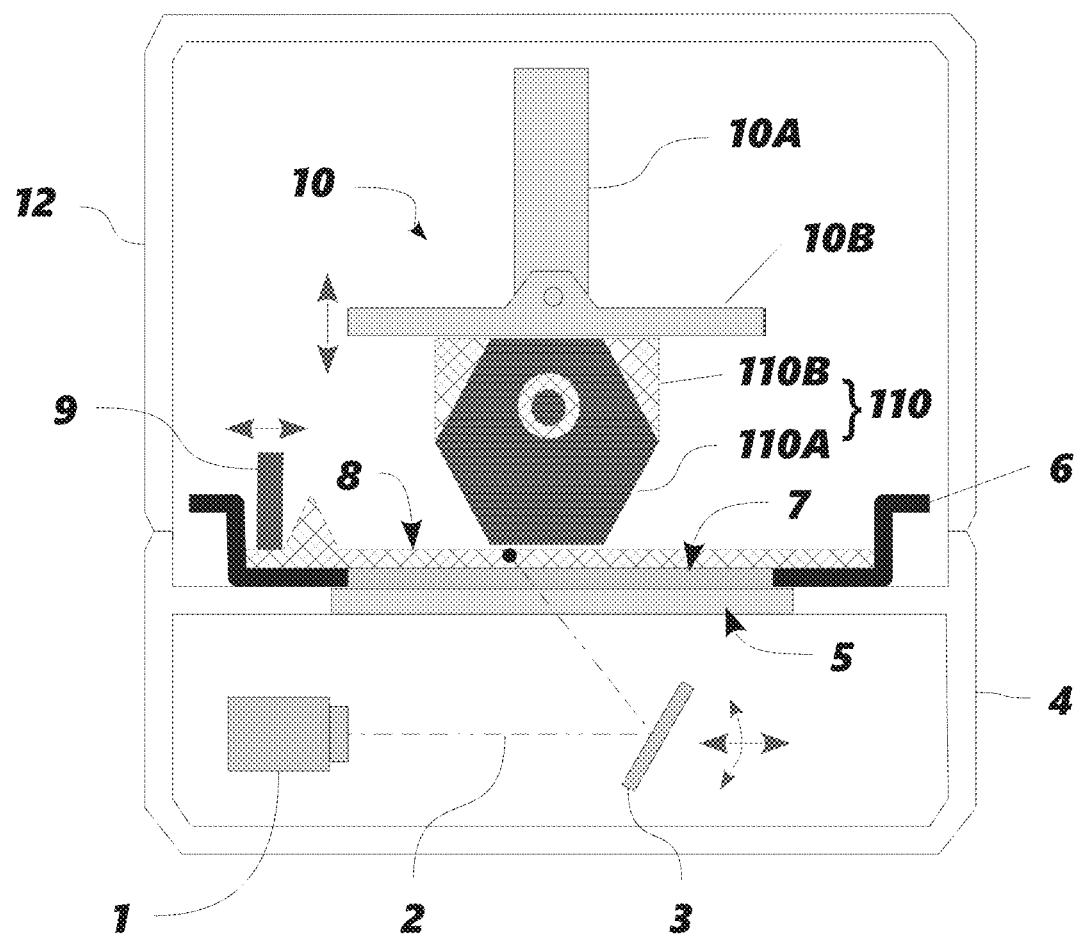
FIG. 6 is a diagram that depicts a digital manufacturing device in accordance with one embodiment having a visible wavelength laser and SLS tray installed with partially sintered powder being used as a support.

FIG. 6 is a diagram that depicts a method to achieve the same effect found in top-down selective laser sintering architectures. In FIG. 6, feature 110B is a partially sintered powder that is acting as a support. The partial fusing of the powder shown in feature 110B is achieved by lowering the laser power and/or shortening the dwell time such that the temperature reached in the layer of powder 8 is sufficiently below the temperature required to completely fuse, sinter or melt the powder. That is, the thermal energy is low enough just to hold the powder particles together so that later, the feature 110B can be removed by shaking, vibration, or blowing air onto three-dimensional object 110 using an air knife or a similar device. The bond strength between powder particles is a function of the laser power and dwell time. The embodiment of FIG. 6 takes advantage of this property of laser sintering. To enable the creation of feature 110B, which contains partially sintered and easily removable powder as well as feature 110A, which is fully fused, sintered or melted layer(s), the computer software will modulate the laser power and/or dwell time during the fabrication of the layer of the three-dimensional object 110.

Figure 7:
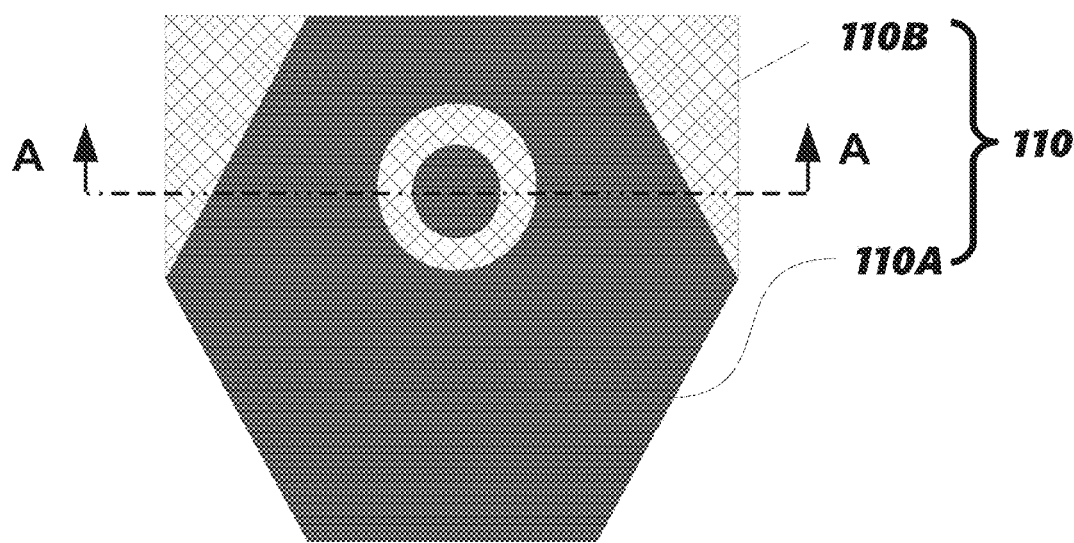
FIG. 7 is a diagram showing a close-up view of the three-dimensional object that contains the partially sintered powder being used as a support.

FIG. 7 is a diagram of a close-up view of the three-dimensional object 110. Feature 110B is the support structure that is partially sintered, while feature 110A is the fully fused, sintered or melted layer(s).

Figure 8:
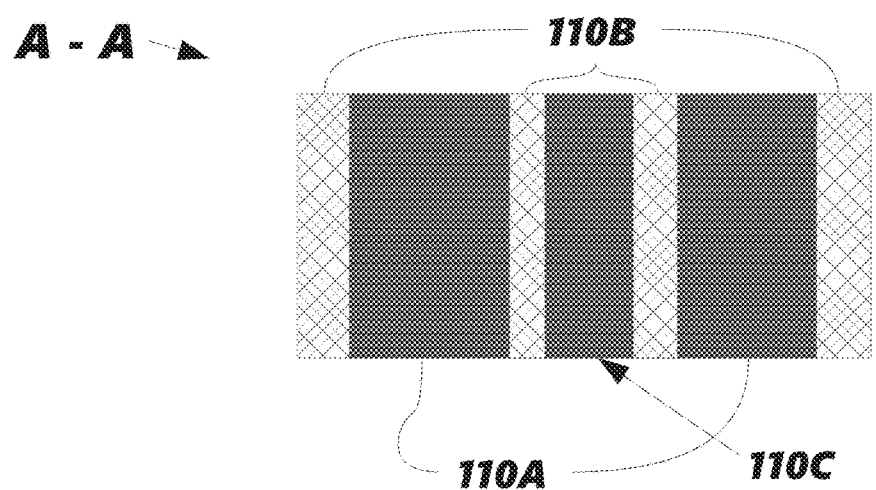
FIG. 8 is a diagram of a cross-sectional view of the three-dimensional object from FIG. 7.

FIG. 8 is a diagram showing cross-section A-A of FIG. 7. The cross-section A-A includes partially fused region 110B and the fully fused, sintered, or melted region 110A of three-dimensional object 110. Reference numeral 110C identifies a fused, sintered, or melted region. This feature becomes a shaft that can rotate when the partially sintered region 110B is removed by using air to blow away the semi-loose powder 110B or other means of shaking the partially sintered powder loose. The act of partially sintering the powder of the present embodiment is one of the key features of the top-down selective laser sintering. That is, the ability to create an assembly of parts that are movable relative to each other, such as the rotating shaft 110C.

The embodiments of FIG. 1 and FIG. 6 can be configured to fabricate three-dimensional objects made from photo-curable resins. This allows the present embodiments to provide the operator with the advantages of selective laser printing and stereolithography with the use of a single digital fabrication apparatus. That is, when the present embodiment is configured to fabricate three-dimensional objects using powder materials, it provides the operator with stronger materials, such as plastics, metals, and ceramics, in addition to the ability to print parts with easily removable powder as well as assemblies of three-dimensional objects with movable parts. When the same apparatus of the present embodiment is configured to fabricate three-dimensional objects using curable liquid resin materials, the operator can fabricate three-dimensional objects with high resolution and smooth surface parts.

Figure 9:
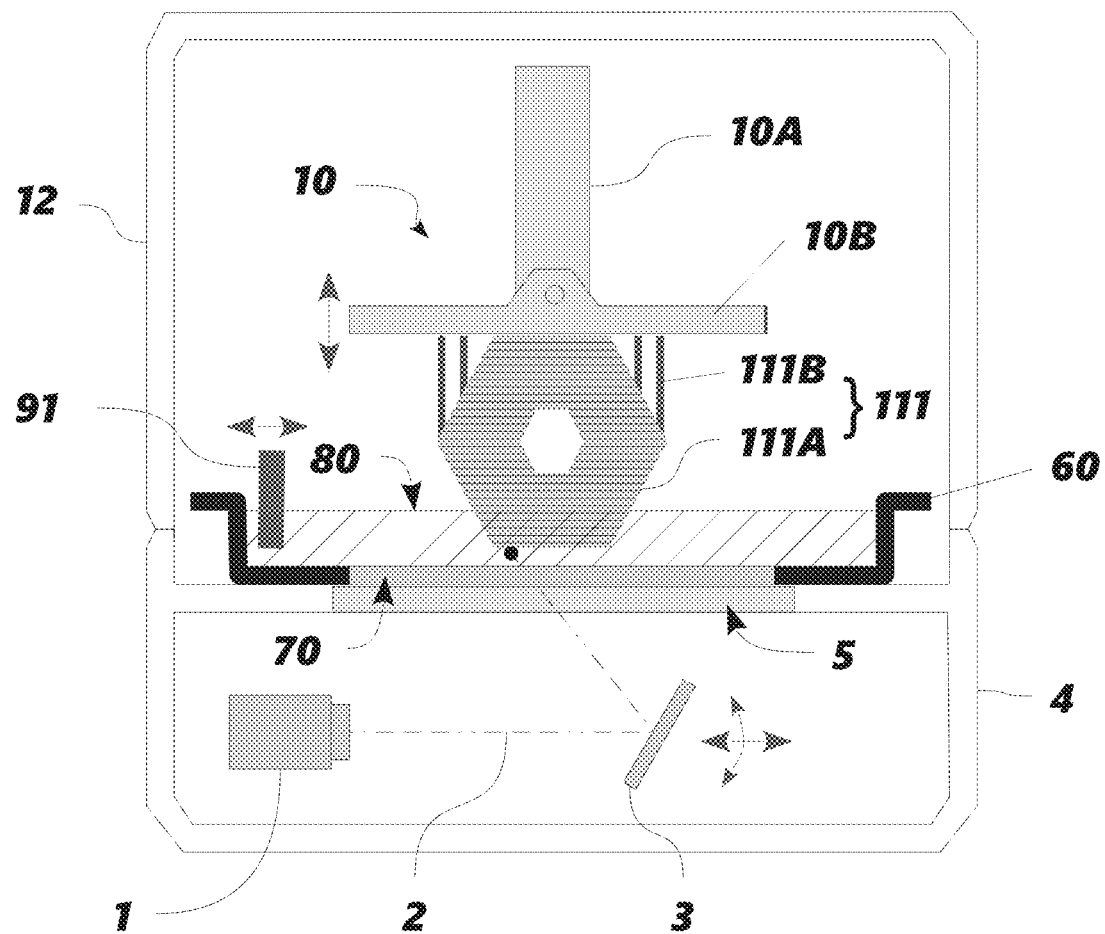
FIG. 9 is a diagram that depicts a digital manufacturing device in accordance with another embodiment involving a visible wavelength laser and with the SLA vat installed.

FIG. 9 is a diagram that depicts a digital manufacturing device in accordance with another embodiment. In order to configure the apparatus of the present embodiment to fabricate stereolithography (SLA) three-dimensional objects made from liquid resin material, the SLS tray from FIG. 1 and FIG. 6 is replaced with an SLA vat 60 shown in FIG. 9. The SLA vat 60 comprises a transparent window 70. The transparent window 70 is attached to the structure of the SLA vat 60 such that the visible light photo-curable liquid resin 80 is unable to leak from the SLA vat 60. An optional recoater 91 is depicted in FIG. 9. Note that the laser module 1, laser beam 2, galvanometer 3, transparent window 5, bottom enclosure 4, build platform 10, and top enclosure 12 remain the same in FIGS. 1, 6, and 9. What has changed is that SLS tray 6 is replaced with the SLA vat 60.

The present embodiment apparatus may have a sensor (not shown) that detects whether there is a SLS tray 6 installed or SLA vat 60 installed. Examples of sensors are optical sensors that read a code or a distinct feature of the SLS tray 6 or SLA vat 60, or RFID/NFC reader and chip, etc. Instead of using a sensor to detect if a tray or vat is being used, the operator of the apparatus can also enter the information into the computer that is controlling the apparatus shown in FIG. 9. Once the type of container (SLS tray 6 or SLA vat 60) is known by the computer, the software can then set the print process parameters accordingly. For example, in order to fabricate an SLA three-dimensional object, the laser power and dwell time settings may need to be adjusted. For the most part, the overall additive manufacturing process sequence described when the SLS tray was installed should be the same for the SLA three-dimensional object fabrication. That is, the sequence of moving the build plate 10B away from the top of transparent window 70, replenishing the resin with a thickness equivalent to one cross-sectional layer of the three-dimensional object 111, curing an image of a cross-sectional layer of the three-dimensional object 111 into resin layer 80 using the computer controlled laser module 1 and galvanometer 3, then finally moving the build plate 10B away from the transparent window 70 and repeating the sequence until all layers of the three-dimensional object 111 are fabricated and fused together, remains the same.

One difference in the physics of the process is that a liquid resin material is being used instead of a powder material. The viscosity of the liquid resin is such that it will automatically flow between the bottom of build plate 10B and the top surface of transparent window 70 for the first layer and then for fabrication of subsequent layers, the liquid curable resin can flow between the bottom surface of three-dimensional object 111 and the top surface of transparent window 70. The transparent window 70 can be constructed of a rigid transparent material such as borosilicate glass, fused silica, etc., or it can be fabricated from a transparent flexible material such as FEP, as is often used in bottom-up SLA printers.

Transparent window 70 could also be constructed with a transparent conductor 7C, as shown in FIG. 5. In this case, the transparent conductor 7C with a voltage applied can act as a heater that warms up the liquid resin so that the viscosity of the resin decreases to improve the flow of the liquid resin as it coats the top of the transparent window 70. The optional recoater 91 can function to also improve the uniformity of the liquid resin coating 80 on the top surface of transparent window 70. The recoater 91 can also act to clean the top surface of transparent window 70 should there be any failure during the fabrication sequence of a layer (i.e., if there is cured resin material that is stuck to the top surface of the transparent window 70).

Note that once the SLA fabrication sequence is complete, the completed three-dimensional object 111 is removed from the build plate 10B by using the methods described previously for removing the SLS fabricated three-dimensional object 11 of FIG. 1. Note that the SLA three-dimensional object 111 can also have support structure 111B that can be removed using the methods described for the three-dimensional object 11 of FIG. 1. After the fabrication of SLA three-dimensional object 111 is complete, it will likely have residual liquid resin on the surface. This surface can be cleaned using alcohol derivatives, as is typical in conventional SLA processes. It is also typical to do a final cure of the SLA three-dimensional object 111 using a UV light box or similar device.

It is often desirable to etch, cut, or mark objects or a work piece. This is traditionally accomplished using a CNC laser engraving and cutting machine. There are many such products on the market today that are designed specifically for the sole purpose of engraving, cutting, and/or marking. An example of a visible wavelength laser engraver and cutter is the LE-4040 desktop laser engraver sold by FoxAlien. There are many other suppliers of similar products on the market. Various embodiments can also be configured to engrave, cut, or mark a workpiece.

Figure 10:
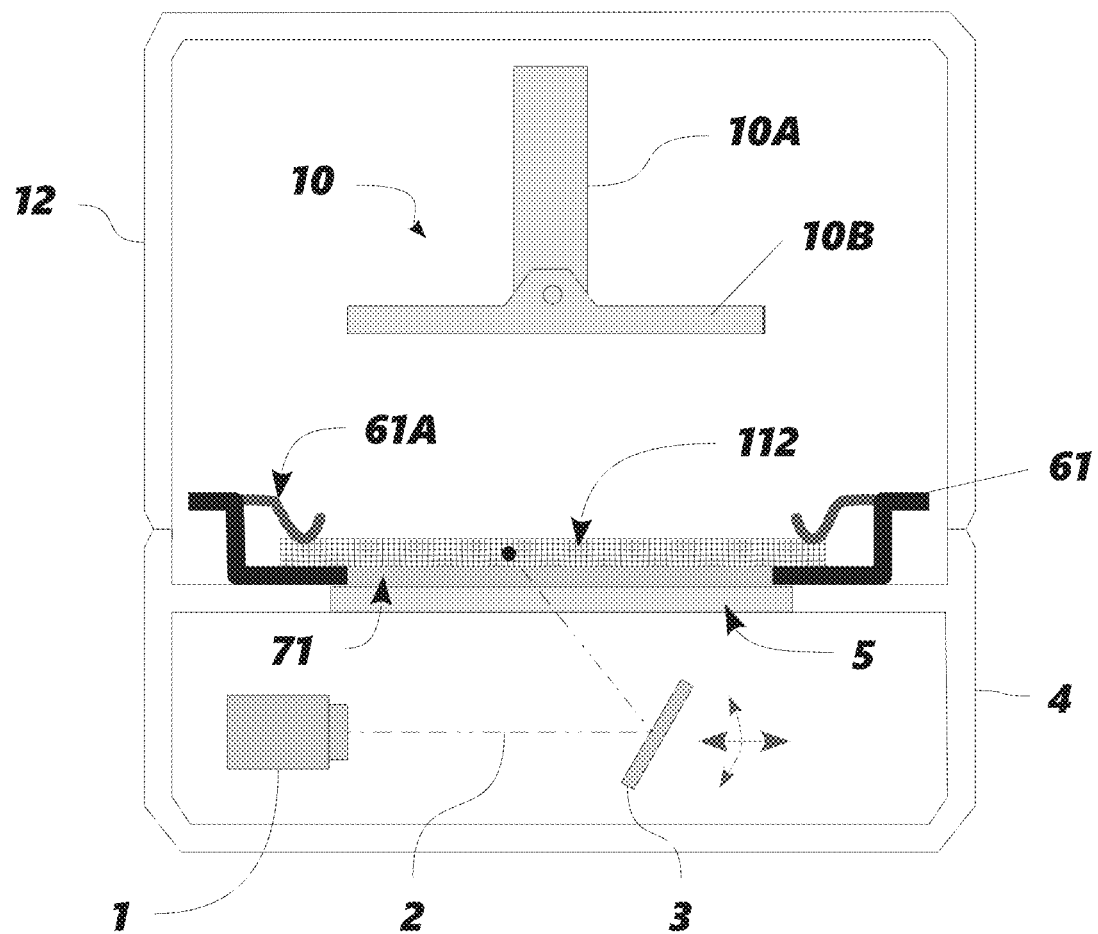
FIG. 10 is a diagram that depicts a digital manufacturing device in accordance with another embodiment. involving a visible wavelength laser and with the ECM plate installed.

FIG. 10 is a diagram showing an embodiment where the apparatus depicted in FIGS. 1, 6, and 9 is being configured with an Engraver, Cutting, and Marking (ECM) plate 61. ECM plate 61 optionally includes a transparent window 71 attached to it. Should the transparent window 71 be included, it could serve to prevent dust or other debris from contaminating transparent window 5. The ECM tray 61 could also have a clamp 61A attached to it. The purpose of the clamp 61A is to hold workpiece 112 in place. Note that the laser module 1, laser beam 2, galvanometer 3, transparent window 5, bottom enclosure 4, build platform 10, and top enclosure 12, along with other hardware components not shown, remain the same as in FIGS. 1, 6, 9, and 10. What has changed is that SLS tray 6 or SLA vat 60 is replaced with the ECM plate 61.

As described earlier, one embodiment may have a sensor (not shown) that detects whether the SLS tray 6, the SLA vat 60, or the ECM plate 61 is installed. Instead of using a sensor to detect if a tray, vat, or plate is being used, the operator can also enter the information into the computer that is controlling the apparatus shown in FIG. 9. Once the type of container (SLS tray 6, SLA vat 60, or ECM plate 61) is known by the computer, the software can then set the print process parameters and algorithms accordingly. For example, in order to engrave, cut, or mark workpiece 112, the laser power and dwell time settings may need to be adjusted. Also, instead of printing multiple layers as is required for the SLS or SLA three-dimensional fabrication modes, the ECM mode will typically require a single layer since the workpiece surface that is being engraved, cut, or marked is typically two-dimensional.

In FIG. 10, the initial surface of the workpiece that is being worked on is the bottom surface of workpiece 112 that is juxtaposed with the top surface of the transparent window 71. Note that laser module 1 and/or galvanometer 3 could comprise an automatic laser focus system. The purpose of the automatic focusing system is to adjust the location where the laser beam 2 is in focus. So, for example, if the bottom of workpiece 112 is irregularly shaped, the focal point of the laser can be adjusted so that it is always focused on the appropriate workpiece surface. In addition, if it is desired to engrave deeply or cut the workpiece 112, the auto-focus feature can adjust the focal point so that the laser continues to cut deeper into the material of workpiece 112. The exhaust system located within the top enclosure 12 can act to extract the ablation debris from the engraving, cutting, or marking fabrication process.

Note that another approach for the configurable visible light digital manufacturing apparatus is to use the same container 6 and recoater mechanism 9 and only change the print process parameters and algorithms in software. That is, if the operator would like to additively fabricate a three-dimensional object 11 with powder 8, then the operator would enter the appropriate information into the computer. Alternatively, the apparatus can have a switch for SLS mode. The operator would then add powder 8 to container 6, and the computer-controlled apparatus would then execute the appropriate fabrication steps. Similarly, if the operator desires to fabricate a three-dimensional object using a liquid resin, the operator would ensure that tray 6 is free of powder and then add enough liquid resin. The configurable digital manufacturing apparatus can then switch to the SLA mode by actuating a switch or entering the appropriate information using the computer. Finally, if the operator desires to etch, cut, or mark on a substrate, the operator can reuse the same tray 6, ensuring that it is free of powder or liquid resin. The operator would then install the workpiece 112 and engage a clamp 61A that would now be attached to tray 6. The same configurable digital manufacturing apparatus can then switch to the ECM mode by actuating a switch or entering the appropriate information using a computer. Of course, the components of the system such as the container 6, the transparent window 7, and the recoater 9 would be designed to ensure that these components can operate reliably when they are tasked to function somewhat differently during each digital manufacturing mode (i.e.—SLS, SLA, or ECM).

Figure 11:
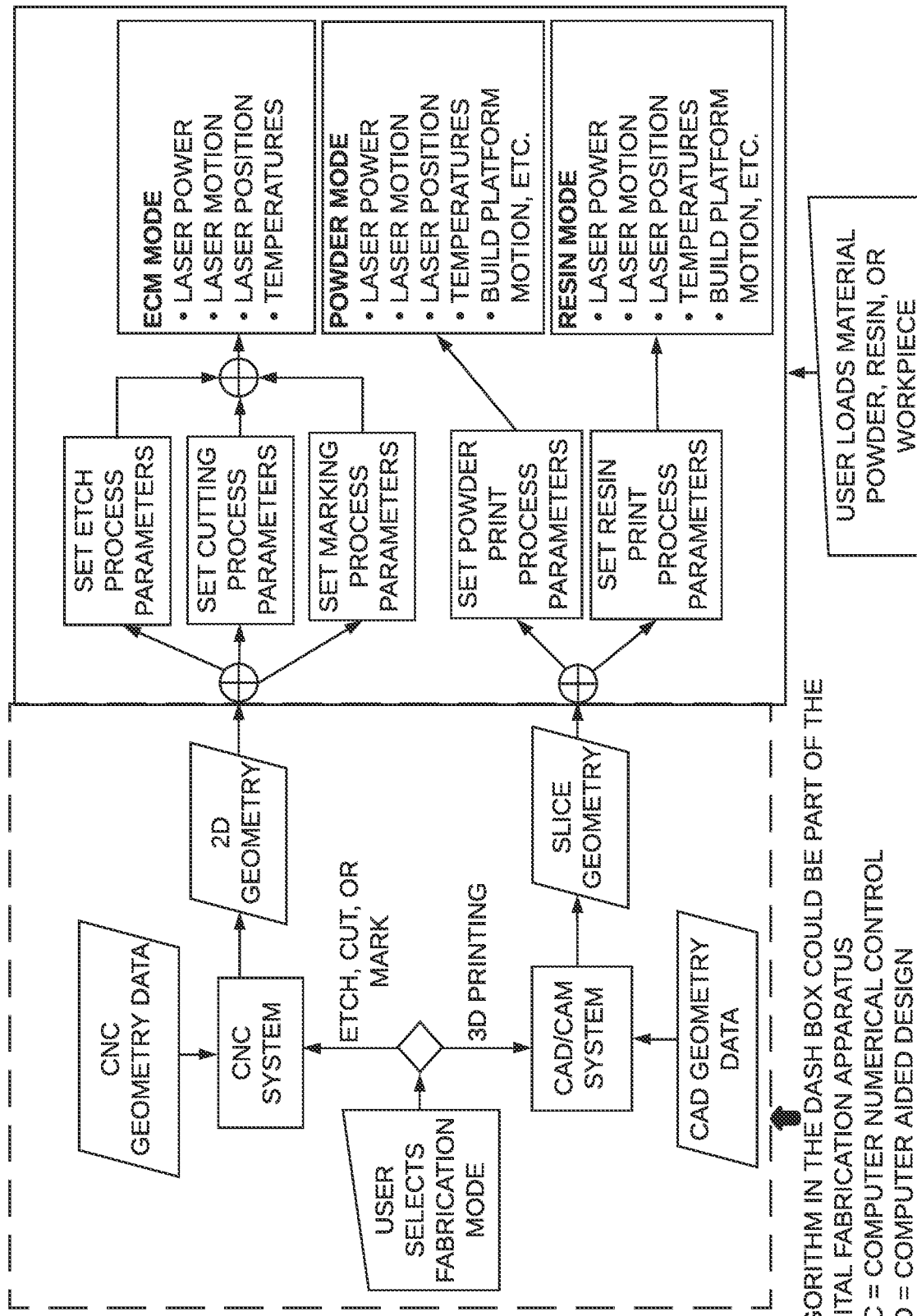
FIG. 11 is a diagram of an algorithm in accordance with one embodiment usable to control the device to fabricate with powder or resin, or to etch, cut, or mark a workpiece without changing the physical hardware.

FIG. 11 is a diagram showing an embodiment of the software/hardware algorithm where the hardware remains the same and the software algorithm controls the configuration of the apparatus. Starting on the left side of the flowchart, the operator selects a digital fabrication mode, i.e., powder (SLS), resin (SLA), or etch, cut, or mark (ECM). Once the mode is selected, the appropriate branch of the software is executed. If the objective is to etch, cut, or mark a workpiece, then the software can select the 'Etch, Cut, Mark' branch of the flowchart, which results in the Computer Numerical Control (CNC) System being executed. The CNC system retrieves the geometry to be etched, cut, or marked from a data source of the user's choice. The CNC system then prepares the two-dimensional geometry in the format that the Digital Fabrication Apparatus (e.g., the hardware shown in FIG. 1) understands.

Next, depending on which type of CNC fabrication is needed (etch, cut, or mark), the appropriate parameters are selected and set in the hardware (e.g., laser power, motion of the laser, the position of the laser, environmental temperatures, etc.). The operator should also load the workpiece as indicated in the bottom right of the flowchart. The system (software/hardware) would then execute the appropriate fabrication process. Should the user decide to print a three-dimensional object, then the algorithm would follow the 3D Printing branch, which would execute the Computer Aided Design and/or Computer Aided Manufacturing (CAD/CAM) System. The CAD/CAM system retrieves the geometry to be additively fabricated. Using a slicing software, the CAD/CAM system would create the appropriate slicing data files that the Digital Fabrication Apparatus (e.g., the hardware shown in FIG. 1) understands.

Next, depending on which type of additive manufacturing is needed (powder (SLS) or resin (SLA)), the appropriate parameters are selected and set in the hardware (e.g., laser power, motion of the laser, the position of the laser, the motion of the build platform, the temperature of the powder or resin, etc.). The operator should also load the material (e.g., resin or powder) as indicated in the bottom right of the flowchart. The system (software/hardware) would then execute the appropriate fabrication process for either a resin-based object fabrication or a powder-based object fabrication, depending on which type the user selected at the left of the flowchart.

FIG. 11 also depicts a box that has a dashed line. This is to indicate that the complete algorithm could reside within the digital fabrication apparatus's onboard computer, control system, or similar device. If that is the case, then there could be a switch (e.g., a physical switch or a graphical user interface) that allows the user to select what type of fabrication is desired (i.e., ECM, SLS, or SLA). Note that to execute the algorithm depicted in FIG. 11, the user did not need to change the type of hardware that contains the powder, resin, or workpiece. The configuration of the digital fabrication apparatus can be changed only using the software algorithm depicted in FIG. 11.

Thus far, FIGS. 1 through 11 describe the embodiments where a single visible wavelength laser module 1 and galvanometer 3 are used to fabricate a three-dimensional object using powder, liquid curable resin, or to etch, cut or mark a workpiece using the same apparatus. It is often desirable to fabricate objects using lasers with wavelengths beyond the visible range (e.g., infrared wavelength (IR)

lasers). IR lasers typically have significantly higher power when compared to the visible light lasers. Examples of IR lasers are near IR lasers with wavelengths on the order of 1 micron and CO2 lasers with wavelengths on the order of 10 to 11 microns. CO2 laser energy is also absorbable in a lot more types of materials when compared to the visible light laser or the near IR laser. For that reason, CO2 lasers are used in many manufacturing processes.

Figure 12:
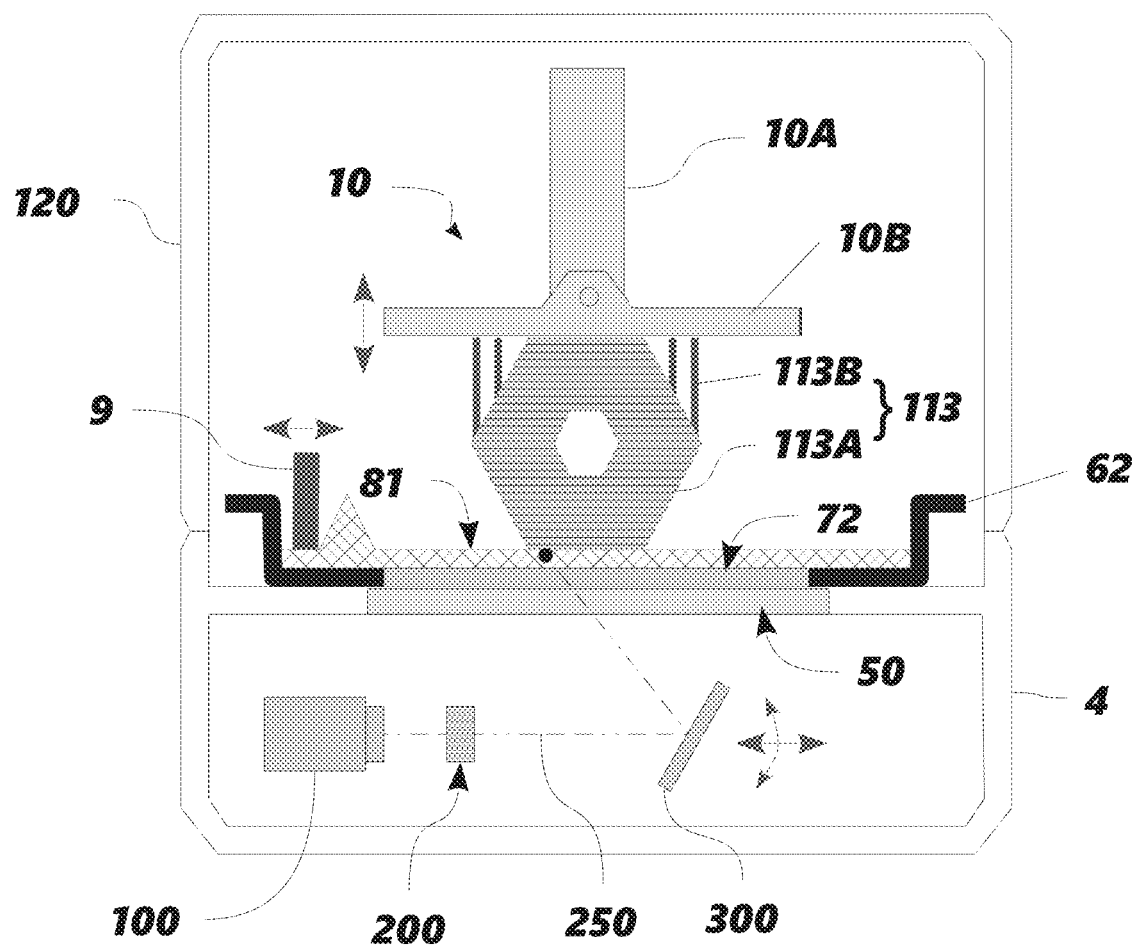
FIG. 12 is a diagram that depicts a digital manufacturing device in accordance with one embodiment having an infrared wavelength laser and the SLS tray installed.

FIG. 12 is a diagram depicting another embodiment of the apparatus comprising an infrared laser module 100. The emitted laser beam 250 goes through a wavelength converting module 200. The wavelength converting module 200 comprises an optical switch that when turned on, allows the beam of laser to be converted to the visible wavelength. The optical switch is controlled by the computer or similar device that is controlling the functions of the digital manufacturing device. If the optical switch is turned on, the laser beam can pass through a wavelength converter crystal, e.g., Beta Barium Borate (BBO) or CsBe2BO3F2 (CBBF). These nonlinear crystals can change the wavelength of the emitted beam from an infrared wavelength to a visible or ultraviolet wavelength. Typically, there is a significant drop in laser power after the laser passes through the wavelength converter crystal. For example, the output power of the laser beam after exiting the crystal can be as little as five percent of the input laser beam power. However, in various embodiments, a 95-percent decrease in output power is sufficient depending on the digital manufacturing mode desired.

The emitted laser beam 250 is controlled by galvanometer module 300 in a manner similar to the galvanometer 3 in FIGS. 1, 6, and 9. A difference with galvanometer module 300 is that the optical elements, such as the mirrors, lenses, and windows, will need to be designed for the IR wavelength laser. Since such lasers can have higher power than the visible light laser, more cooling capacity may be necessary (e.g., liquid cooling or cooling with heat pipes, etc.). The laser beam 250 then passes through transparent window 50. Transparent window 50 serves a similar function as transparent window 7 in FIGS. 1, 6, and 9. The main difference is that transparent window 50 is constructed from materials that are transparent to IR wavelength lasers and can withstand the higher power laser. Examples of such materials are Zinc Selenide (ZnSe), Potassium Bromide (Kbr), Germanium (Ge), etc. As with the visible wavelength laser embodiment depicted in FIGS. 1, 6, and 9, the optical elements 100, 200, 300, and 50 in FIG. 12 are enclosed in lower enclosure 4. To fabricate a three-dimensional object 113 made from SLS powder, an SLS tray 62 is installed. The SLS tray 62 comprises a transparent window 72. Transparent window 72 serves a similar function as transparent window 7 in FIG. 1. However, the transparent window 72 is made from materials that are transparent to IR wavelength lasers as well as materials that can withstand higher thermal energy. The choice of materials is similar to the materials for transparent window 50. The concept shown in FIG. 5 would also apply to transparent window 72 in that the materials for the AR coating 7A, the transparent member 7B, the transparent conducting layer 7C, and the transparent non-stick coating 7D would need to be transparent to IR wavelength lasers and be able to withstand high thermal energy. Examples of materials that would fit the requirements are Silicon Nitride (Si3N4) and Titanium Dioxide (TiO2) for the AR coating 7A; Zinc Selenide (ZnSe), Potassium Bromide (Kbr), and Germanium (Ge) for the transparent member 7B; transparent conducting oxides (TCO) for the transparent conducting member 7C, and silicon-oxygen-carbon (carboxy silicon) for the transparent non-stick coating 7D.

The process to fabricate a three-dimensional object 113 is mostly the same as described for fabricating three-dimensional object 11 in FIG. 1. A difference is that wavelength converter module 200 would need to be switched off so that the IR wavelength beam can be transmitted to the galvanometer 300. That is, the IR laser beam bypasses the wavelength converting crystal. In addition, the material options for the powder 81 would be materials that are able to absorb IR wavelength lasers. A partially sintered powder support structure like that described in FIGS. 6, 7, and 8 is also relevant for the apparatus shown in FIG. 12. The IR laser power and dwell time can also be modulated to partially sintered powder 81.

Figure 13:
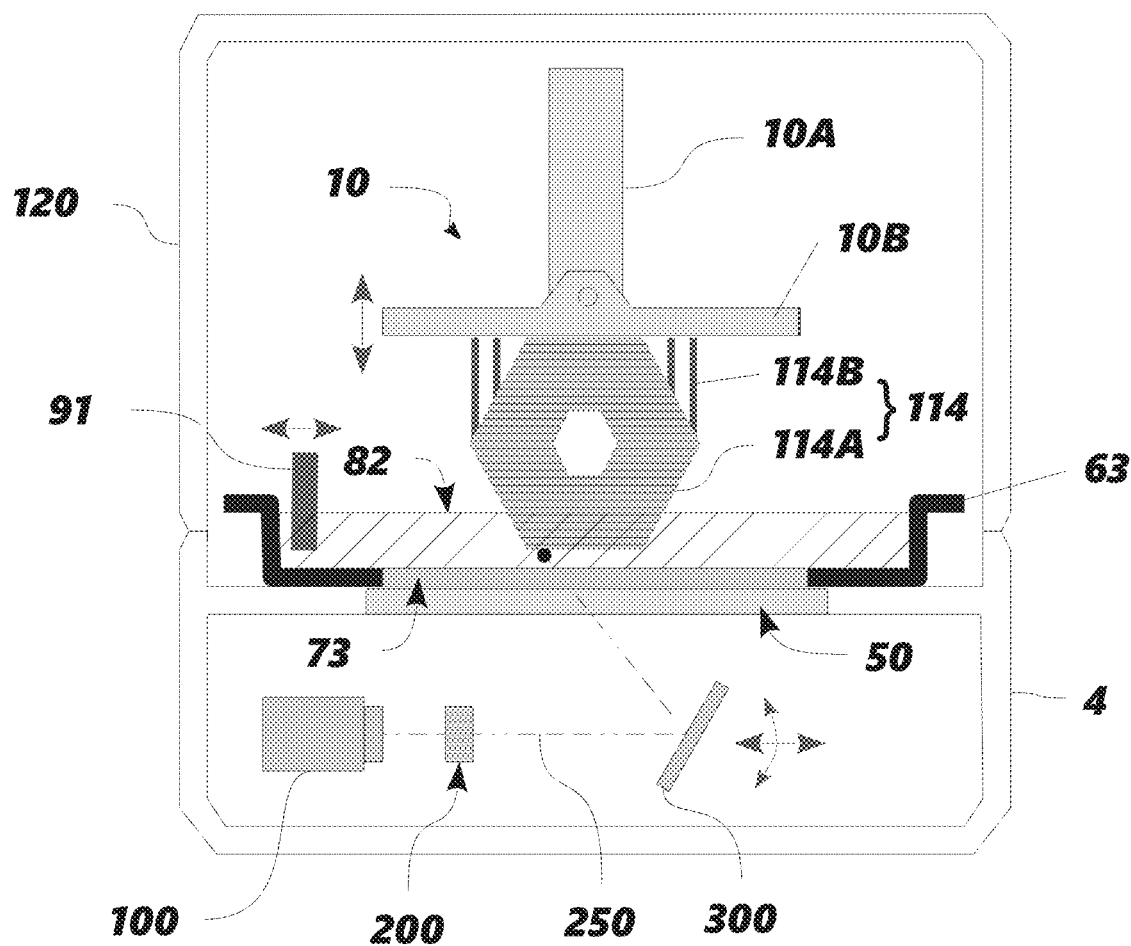
FIG. 13 is a diagram that depicts a digital manufacturing device in accordance with one embodiment having an infrared wavelength laser and the SLA vat installed.

FIG. 13 is a diagram that depicts a digital manufacturing device in accordance with one embodiment. In this embodiment, an infrared wavelength laser is used. The apparatus is configured with the SLA vat installed. By switching on the wavelength converter module 200, the IR wavelength laser beam emitted from laser module 100 can be converted to a visible light or UV wavelength laser beam 250 with typically lower output power than the input power. However, the lower-power UV or visible light laser beam 250 is sufficient to cure the liquid resin 82 shown in FIG. 13. The process to fabricate a three-dimensional object 113 made from liquid resin 81 is the same as described for fabricating the SLA three-dimensional object 111 in FIG. 9. SLA vat 63 is the same as SLA vat 60. A difference could be that transparent window 73 may need to be an appropriate material for the UV wavelength if the converting crystal selected in module 200 is designed to convert to the UV wavelength. The result is a three-dimensional object 114 that is made from material that is cured from liquid photo-curable resin 82.

Figure 14:
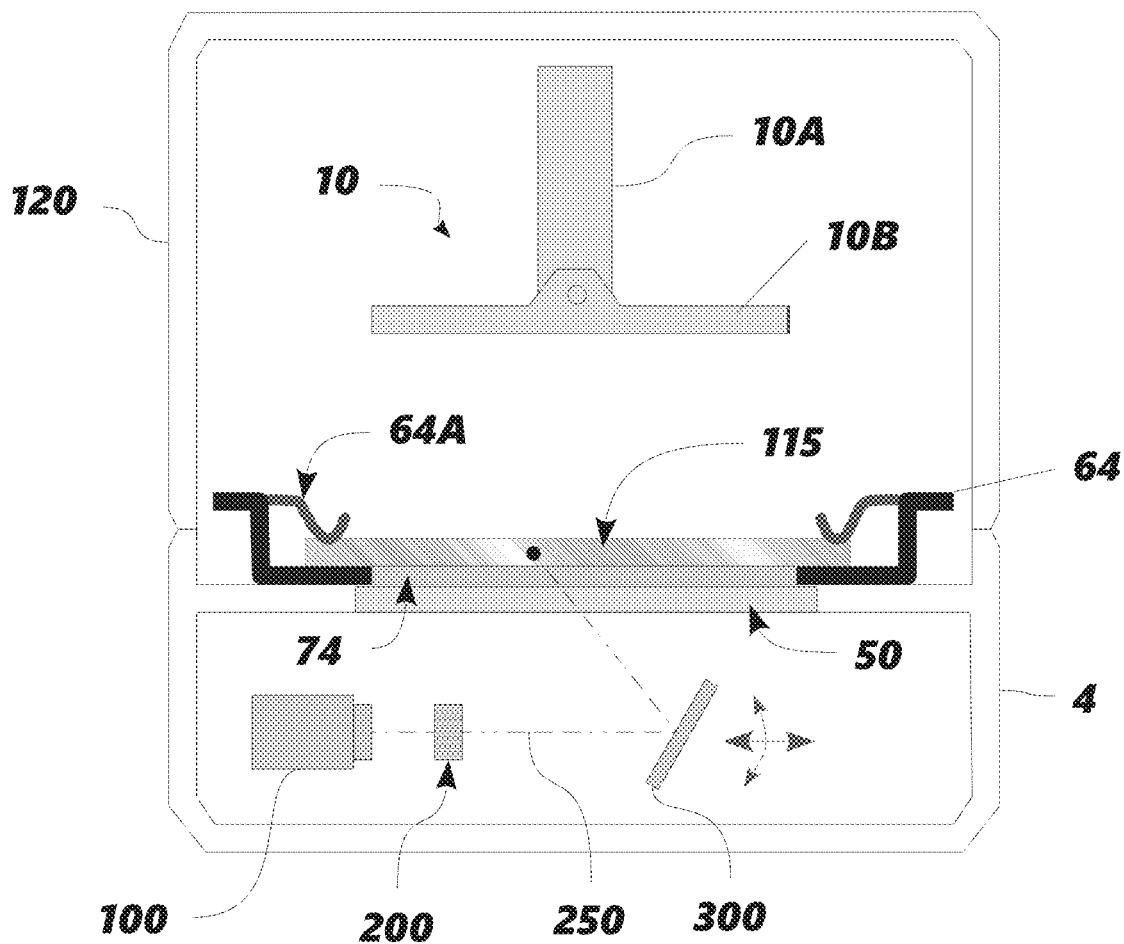
FIG. 14 is a diagram that depicts a digital manufacturing device in accordance with one embodiment having an infrared wavelength laser and the ECM plate installed.

FIG. 14 is a diagram that depicts a digital manufacturing device in accordance with one embodiment. In this embodiment, an infrared wavelength laser is used. The apparatus is configured with the ECM plate installed. In order to etch, cut, or mark workpiece 115, the wavelength converting module 200 is turned off so that the IR wavelength laser can bypass the wavelength converting crystal within module 200. The emitted laser beam 250 would be high-power and have an IR wavelength. To etch, cut, or mark workpiece 115, the ECM plate 64 is installed. The ECM plate 64 comprises an optional transparent window 74. Transparent window 74 serves a similar function as transparent window 71 in FIG. 10. However, the transparent window 74 is made from materials that are transparent to IR wavelength lasers and can withstand higher thermal energy. Examples of such materials are Zinc Selenide (ZnSe), Potassium Bromide (Kbr), Germanium (Ge), etc. The process to etch, cut, or mark workpiece 115 is mostly the same as described for workpiece 112 in FIG. 10. A difference is that the material options for the workpiece 115 would be materials that are able to absorb IR wavelength laser energy. Note that the material for the upper enclosure 120 is selected to prevent the high-power IR laser from injuring the eye of the observer.

Another approach for the configurable IR digital manufacturing apparatus shown in FIGS. 12, 13, and 14 is to use the same container and recoater mechanism and only change the print process parameters in the software. That is, if the operator would like to additively fabricate a three-dimensional object 113 with powder 81, then the operator would enter the appropriate information into the computer or flip a physical switch to the SLS mode. The operator would then add powder to container 62 and the computer-controlled apparatus would then execute the appropriate fabrication steps and print process parameters. Similarly, if the operator desires to fabricate a three-dimensional object using a liquid resin 82, the operator would ensure that tray 63 is free of powder and then add enough liquid resin. The configurable digital manufacturing apparatus can then switch to the SLA mode by actuating a switch or entering the appropriate information using the computer. Finally, if the operator desires to etch, cut, or mark on a workpiece, the operator can use the same tray 62, again ensuring that it is free of powder or liquid resin. The operator would then install the workpiece 115 and engage a clamp 64A that would now be attached to tray 64. The same configurable digital manufacturing apparatus can then switch to the ECM mode by actuating a switch or entering the appropriate information using a computer. Of course, the components of the system such as container 62, transparent window 72, and the recoater 9 would be designed to ensure that these components can operate reliably when they are tasked to function somewhat differently during each mode (SLS, SLA, or ECM). Again, refer to FIG. 11 for an embodiment of the software/hardware algorithm.

Figure 15:
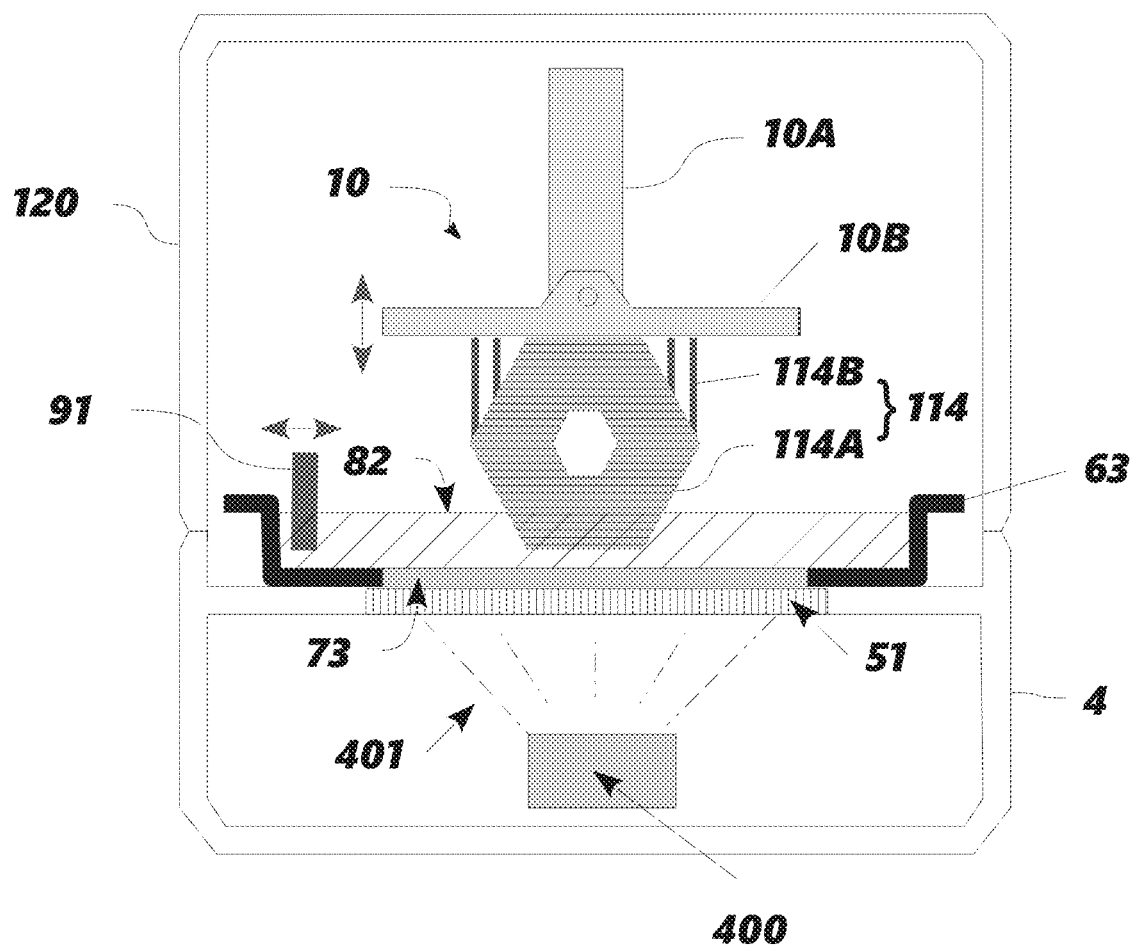
FIG. 15 is a diagram that depicts a digital manufacturing device in accordance with one embodiment having a UV or visible wavelength light source used in conjunction with an LCD light modulator and the SLA vat installed.

FIG. 15 depicts a bottom-up SLA additive manufacturing device. In this embodiment, a light box 400 projects a uniform irradiation of light 401 to a Liquid Crystal Display (LCD) panel 51. Instead of using a laser beam along with a galvanometer to fabricate the three-dimensional object or to etch, cut, or mark the workpiece, a laser-free approach can be used. The projected light 401 typically has a wavelength in the UV or visible light spectrum. As the uniform irradiation of light passes through the LCD panel 51, the LCD panel 51 converts the uniform irradiation into an image that is then projected through transparent window 73.

A computer or similar device controls when and which image is created by the LCD panel 51 by using data from the two-dimensional cross-sectional layer of the three-dimensional object that was created using CAD or similar software. LCD panel 51 then projects the image through the transparent window 73 and focuses the image on the resin side of transparent window 73. The transparent window 73 is attached to SLA vat 63. SLA vat 63 contains the photo-curable liquid resin 82. The process to fabricate a three-dimensional object 114 made from liquid photo-curable resin 82 is the same as described for fabricating the SLA three-dimensional object 111 in FIG. 9. SLA vat 63 is the same as SLA vat 60, except that transparent window 73 may need to be an appropriate material for the UV wavelength if the light box 400 is designed to emit UV wavelength irradiation 401. The result is a three-dimensional object 114 that is made from material that is cured from liquid photo-curable resin 82. The use of a light box 400 and an LCD panel 51 to project through a transparent window 73 into an SLA vat 63 containing resin 82 to create three-dimensional object 114 is known by those skilled in the art. This form of bottom-up LCD-based SLA additive manufacturing device is typically less expensive when compared to the galvanometer-based architecture described in FIG. 9.

In FIG. 15, the LCD panel 51 is shown attached to the structure 4. In another embodiment, the LCD panel 51 is attached to the bottom of the tray 63 instead of enclosure 4. The type of LCD panel used for this configuration is one where the light source is a backlight typical of LCD screens used for computer displays. The backlight is used instead of light box 400. For this embodiment, the LCD with backlight serves the same function in creating a three-dimensional object made from photo-curable resin as described earlier. However, it is now removable and can be used in combination with a configurable digital manufacturing apparatus that also has a laser to print powder as depicted in FIG. 1.

A three-dimensional object can be fabricated from powder material using the device shown in FIG. 1, the SLS tray 6 can be swapped with the ECM plate 61 to etch, cut or mark the workpiece 112 in FIG. 10, or the ECM plate 61 can be swapped with a version of SLA vat 63 containing the backlight LCD screen to print an object from photo-curable resin. For the photo-curable resin configuration, the laser would be turned off and the backlight LCD will be used to create the image for each layer.

In yet another embodiment of the SLA additive manufacturing device, the LCD panel 51 is replaced by a Digital Light Processing (DLP) device (not shown) which uses an array of micro mirrors to create an image that is then projected and focused on the resin side of transparent window 73. The DLP device can also be controlled by a computer or similar device and performs the same function as the LCD panel 51. The DLP and LCD devices are examples of a spatial light modulator (SLM). Other forms of SLMs such as Liquid Crystal on Silicon (LCOS) could also be used to accomplish the same function. For simplicity, throughout this disclosure the LCD is used as an example of a SLM.

Figure 16:
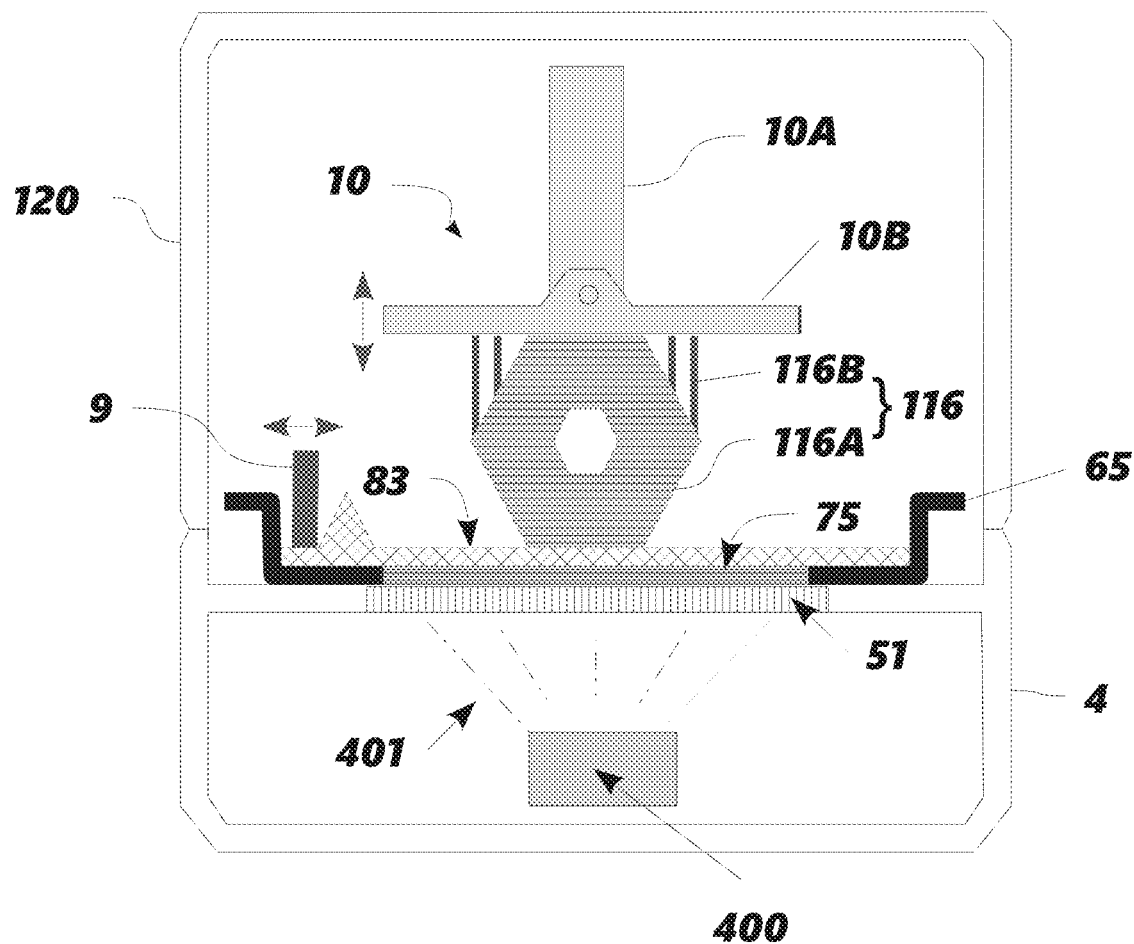
FIG. 16 is a diagram that depicts a digital manufacturing device in accordance with one embodiment having a UV or visible wavelength light source used in conjunction with an LCD light modulator and the SHS tray with an opto electro heater.

FIG. 16 is a diagram that depicts a digital manufacturing device in accordance with one embodiment. In this embodiment, a UV or visible wavelength light source is used in conjunction with an LCD light modulator. The apparatus is configured with the SHS tray containing an opto electro heater. The apparatus is the same as that of FIG. 15 except that the SLA vat 63 is replaced by Selective Heater Sintering (SHS) tray 65 that comprises an opto electro heater array 75. This embodiment enables the fabrication of a three-dimensional object 116 using the powder 83. The details of the novel opto electro heater array 75 will be described later. The function of the opto electro heater 75 is to convert the optical light-based image created by the LCD panel 51 (or another type of SLM device—not shown) into a thermal image with equivalent geometry. The thermal image generated by the opto electro heater 75 then sinters, fuses, or melts the layer of powder 83 (typically 100 microns) in a similar way to how the laser 2 in FIG. 1 sinters, fuses, or melts powder 8. A difference is that since opto electro heater 75 provides its own heat, the powder 83 does not need to absorb the wavelength of light and instead absorbs the heat. Since most materials can absorb heat, the range of materials that can be used with this process is quite wide, including plastics, composite metals, and composite ceramic powders. The process to fabricate a three-dimensional object 116 made from powder 83 is the same as described for fabricating the SLS three-dimensional object 11 in FIG. 1 or SLS three-dimensional object 110 in FIG. 6. SHS tray 65 is essentially the same as SLS tray 6 except that the transparent window 7 is replaced with the opto electro heater 75. The result is a three-dimensional object 116 that is made from sintering, fusing, or melting the powder 83.

A partially sintered powder support structure like that described in FIGS. 6, 7, and 8 is also relevant for the apparatus shown in FIG. 16. The process to enable the partially sintered powder support structure will be different because an opto electro heater 75 is being used instead of a laser. To create the support structure within the relevant layers of the SLS three-dimensional object 116, the opto electro heater 75 would start with a lower power and the LCD would only project the image of the support structure (e.g., the partially sintered region 110B of FIGS. 7 and 8) onto the opto electro heater 75. The opto electro heater 75 would then appropriately convert the support structure image into a thermal image and partially sinter that image into powder 83. Within the same layer, the opto electro heater will increase its available power so that the thermal energy can be sufficient to fully sinter, fuse, or melt the powder 83. The LCD would then only project the image of the useful part (e.g., the partially sintered region 110A of FIG. 7 and fused, sintered, or melted region 110C of FIG. 8) onto the opto electro heater 75, and opto electro heater 75 would fully sinter, fuse, or melt the features for the useful part. The act of partially sintering the powder 83 in this embodiment also maintains one of the key features of the top-down selective laser sintering: the ability to create an assembly of parts that are movable relative to each other, such as fused, sintered, or melted region 110C in FIG. 8, which is shown as a rotating shaft.

Figure 17:
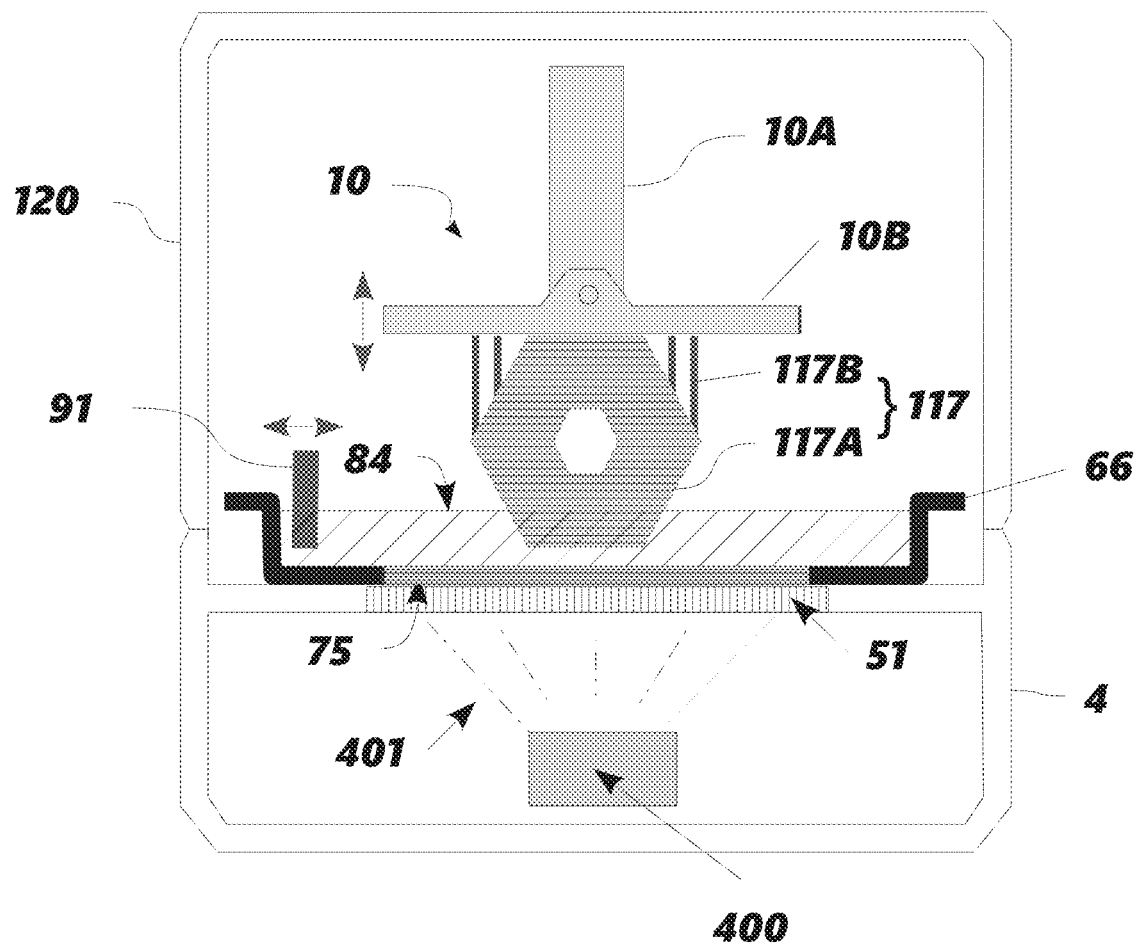
FIG. 17 is a diagram that depicts a digital manufacturing device in accordance with one embodiment having a UV or visible wavelength light source used in conjunction with a LCD light modulator and the SHA vat with an opto electro heater.

FIG. 17 is a diagram that shows the use of the opto electro heater 75 to cure heat-curable resin 84. Heat-curable resin 84 is a liquid material that becomes solid when exposed to heat, similar to the photo-curable resins described earlier. The apparatus is the same as that of FIG. 15 except that the SLA vat 63 is replaced by Selective Heater Apparatus (SHA) vat 66, which comprises an opto electro heater array 75. This embodiment enables the fabrication of a three-dimensional object 117 using the heat-curable resin 84. The thermal image generated by the opto electro heater 75 thermally cures the layer of resin 84 (typically 100 microns in thickness) in a similar way to how the laser 2 in FIG. 9 cures resin 80. A difference is that since opto electro heater 75 provides its own heat, the heat-curable resin material 84 does not need to absorb the wavelength of light and absorbs the heat instead. The process to fabricate a three-dimensional object 117 made from heat-curable resin 84 is the same as described for fabricating the SLA three-dimensional object 111 in FIG. 9 or the SLA three-dimensional object 114 in FIG. 13. SHA vat 66 is essentially the same as SLA vat 60 except that the transparent window 70 is replaced with the opto electro heater 75. The result is a three-dimensional object 117 that is made from heat-cured resin 84.

Figure 18:
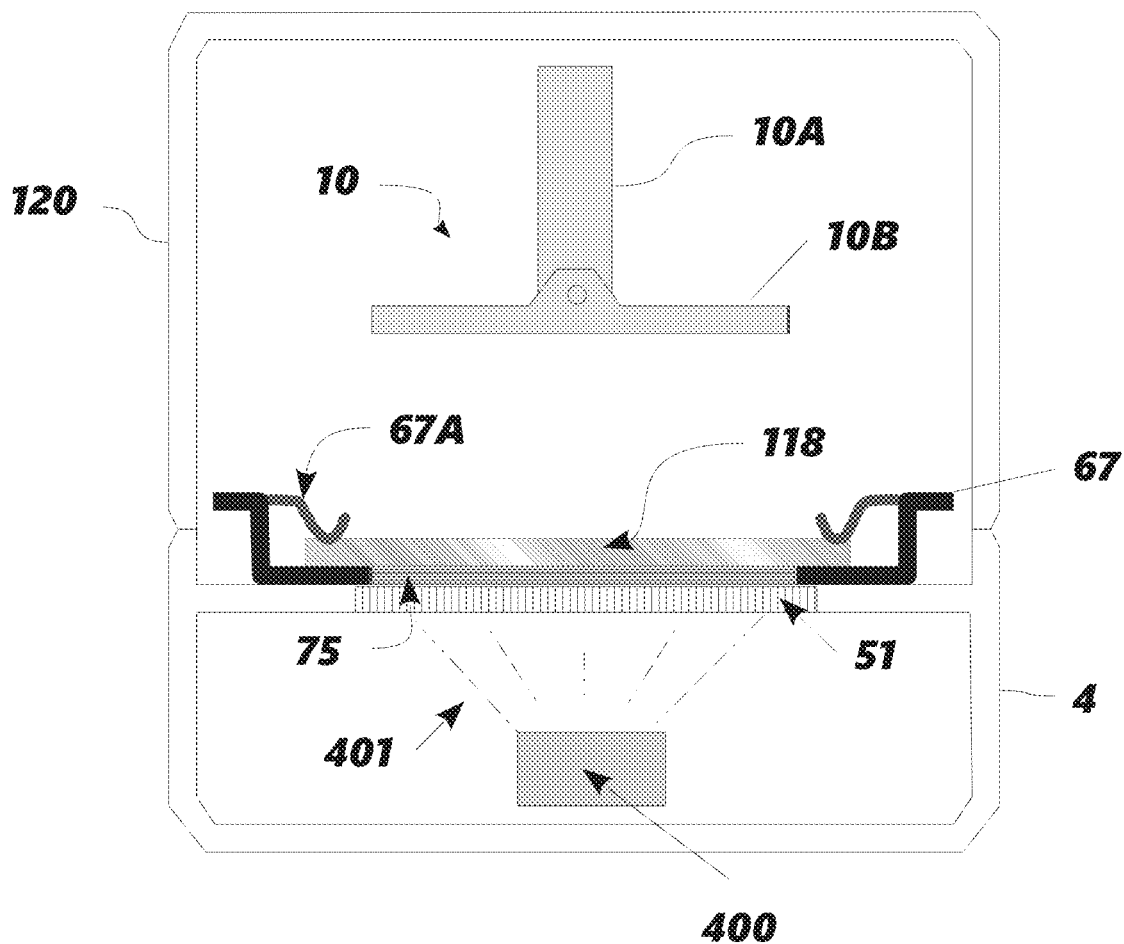
FIG. 18 is a diagram that depicts a digital manufacturing device in accordance with one embodiment having a UV or visible wavelength light source used in conjunction with an LCD light modulator and the M plate with an opto electro heater.

FIG. 18 is a diagram that depicts the use of the opto electro heater 75 to mark on workpiece 118. That is, to burn an image into workpiece 118 or create an image by changing the color of the thermochromic pigments into an image if workpiece 118 comprises thermochromic material. Marking (M) plate 67 comprises the opto electro heater 75 and a clamp 67A to hold workpiece 118 in place during the marking process. Note that the light box 400, uniform light irradiation 401, LCD panel 51, bottom enclosure 4, build platform 10, and top enclosure 120 remain the same in FIGS. 15-18. What has changed in the hardware is that the SLA vat 63, SHS tray 65, or SHA vat 66 is replaced with the M plate 67. As with the previously described embodiments, the present embodiment may have a sensor (not shown) that detects whether an SLA vat 63, SHS tray 65, SHA vat 66, or M plate 67 is installed. Instead of using a sensor to detect if a tray, vat, or plate is being used, the operator of the apparatus can also enter the information into the computer that is controlling the apparatus shown in FIG. 15. Once the type of container (SLA vat 63, SHS tray 65, SHA vat 66, or M plate 67) is known by the computer, the software can then set the print process parameters accordingly. Instead of printing multiple layers as is required for the SLA, SHA or SHS three-dimensional fabrication modes, the marking mode will typically require a single layer since the workpiece surface that is being marked is typically two-dimensional.

Figure 19:
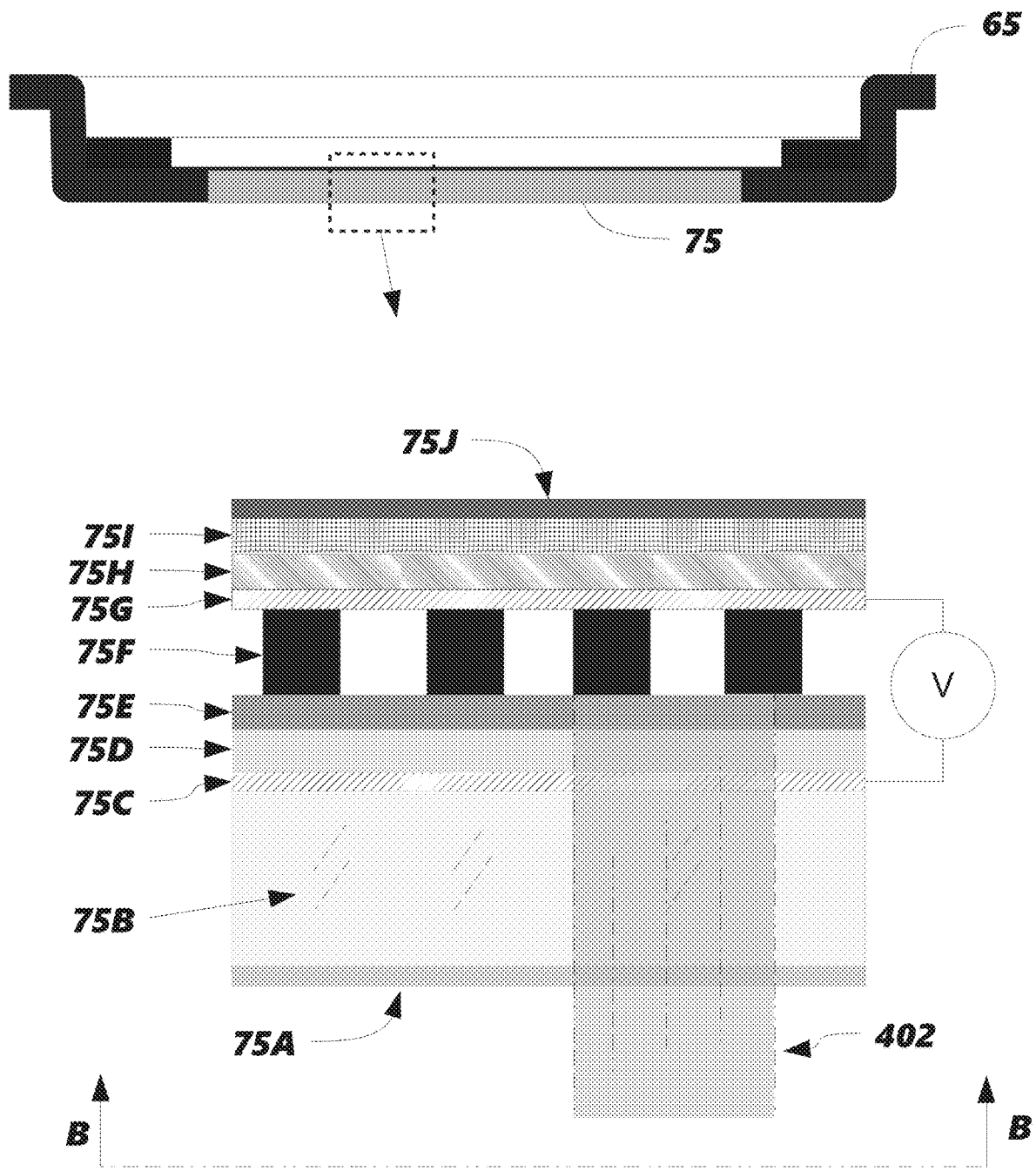
FIG. 19 is a diagram of a cross-sectional view of the opto electro heater.

FIG. 19 is a diagram of a cross-sectional view of the opto electro heater 75. In the cross-sectional view, the opto electro heater 75 comprises several layers of materials. Layer 75A is an anti-reflection (AR) coating. The optional AR coating 75A is designed to maximize the amount of light 402 from the LCD panel 51 of FIGS. 16-18 that is transmitted through the transparent member 75B. It does so by reducing the amount of light 402 that is reflected away from the transparent member 75B. An example AR coating material designed for the visible wavelength light is Magnesium Fluoride (MgF2). A material that transparent member 75B can be manufactured from is glass. The embodiment of the opto electro heater shown in FIG. 19 depicts an electrically conductive and optically transparent layer 75C. The choice of material for layer 75C depends on the wavelength of light 402, the maximum temperature required to fuse or melt the powder 83, and the amount of transparency required. As an example, layer 75C can be made of transparent conducting oxides (TCO) such as indium tin oxide (ITO).

Next is the photoconductor layer 75D. In the dark regions, the electrical impedance of the photoconductor layer is high. When light 402 passes through a region of the photoconductor layer 75D, it reduces the electrical impedance in that region, allowing current to pass through. Therefore, the photoconductor layer 75D acts as a switch that is activated where there is light. An example of a photoconductive material is Hydrogenated amorphous silicon, a-Si: H.

Next is layer 75E, which is a dielectric layer. An example material for layer 75E is Aluminum oxide Al2O3, which can be deposited using atomic layer deposition or other such processes. Above layer 75E is an array of heater elements 75F, which can be made of Tantalum nitride (Ta2N) (often used as a heater element in thermal printheads). Within the array of heater elements, each element can be activated to generate heat when an electrical current is allowed to pass through it. Above the heater array 75F is a layer of conductive material 75G. Conductive material 75G can be made of ITO or opaque electrically conductive metals. The function of conducting layer 75G is to complete the electrical circuit with layer 75C as indicated in the diagram. Above the conducting layer 75G is layer 75H, which is made of silicon dioxide (SiO2), and layer 75I, which comprises tantalum pentoxide or Ta2O5. The silicon dioxide and tantalum pentoxide layers 75H and 75I serve as protective layers for the heater elements and are often used in thermal printheads to resist abrasion when the printhead rubs against a substrate that it is heating up.

Finally, on top of layer 75I is an optional non-stick coating layer 75J that can be permanently bonded as shown. An example of a non-stick coating is carboxy silicon. There are other non-stick coatings that can be used as well. The function of layer 75J is to help with the separation of the fused powder layer from the top of opto electro heater 75 during the additive fabrication of the three-dimensional object 116.

The layers shown in FIG. 19 can be divided into two main functions. Layers 75A, 75B, 75C, 75D, and 75E supply a similar function as optoelectrowetting devices that are typically used in microfluidic devices. Layers 75F, 75G, 75H, 75I, and 75J provide a function like those used in thermal printheads that are typically used in thermal transfer printers and direct thermal printers. By combining the physics principles from optoelectrowetting and from thermal printheads, we can convert a light-based image from the LCD panel or SLM device into a geometrically equivalent thermal image. The opto electro heater 75 can be fabricated using various means, such as microfabrication.

Figure 20:
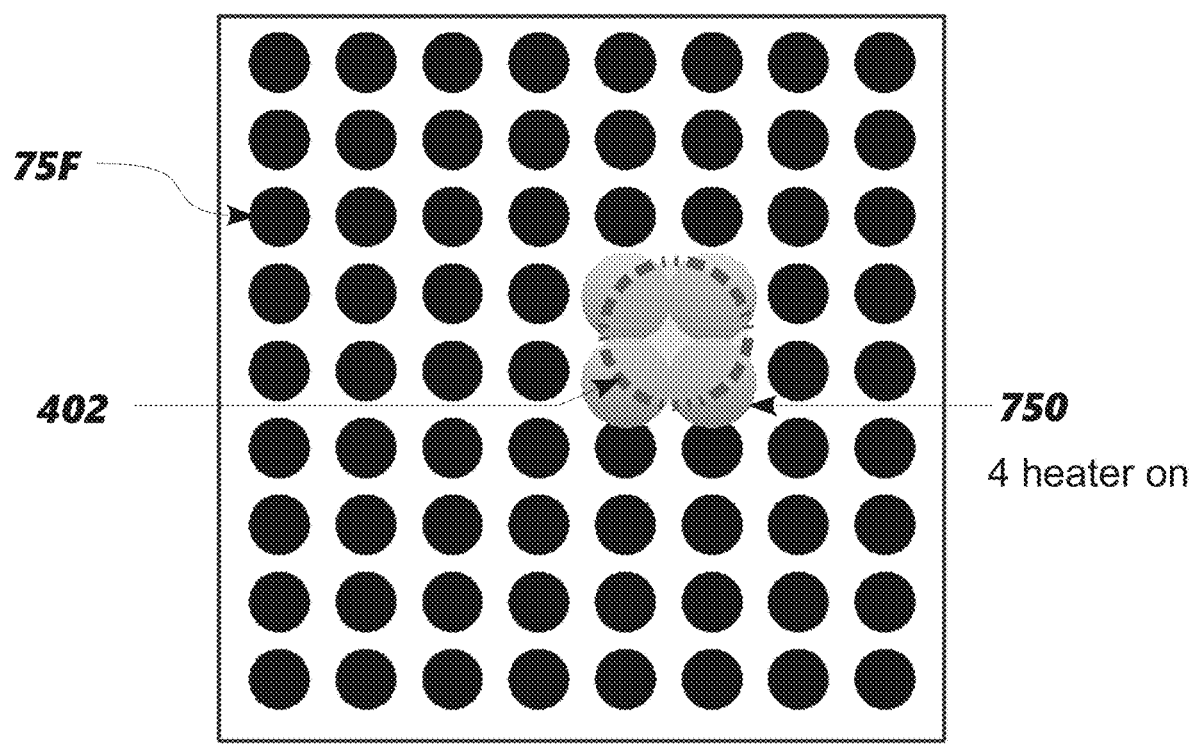
FIG. 20 is a diagram of a bottom-up view of the two-dimensional array of opto electro heater elements.

FIG. 20 is a diagram showing a view of a section of the opto electro heater 75 from below. As an example, the two-dimensional array of heater elements is shown. The vertical and horizontal spacing of the elements could be on the order of 600 dots per inch. As with thermal printheads, the opto electro heater 75 can be designed to reduce thermal crosstalk, that is, reducing the impact of neighboring heating elements affecting the temperature profile of its neighbor. FIG. 20 also illustrates schematically how light 402 irradiated from the LCD panel 51 activates the appropriate heater element(s) 750. In this example, there is sufficient light 402 to activate four heater elements 750. The other heater elements 75J are turned off. This is one example of many possible heating profiles. The location, quantity, and timing of which heater elements are activated depends on the geometry of the image 402 being emitted from the LCD panel 51.

Another function of the opto electro heater 75 is to act as a thermal preheater in whole or in part for the layer of powder 83. As described earlier, preheating can increase the fabrication speed of the image that is fused into the layer of powder 83. Here, the preheating can occur by activating all the heating elements 75F to a temperature just below what is required to partially sinter the powder. In this case, the heating elements would be activated by having the LCD panel 51 project an image where all the pixels are turned on. The opto electro heater 75 would then have a lower voltage setting to enable the temperature of the heating elements to be just below what is required to partially sinter the powder 83. The opto electro heater concept shown in FIGS. 19 and 20 can be applied to other use cases outside of digital manufacturing.

Figure 21:
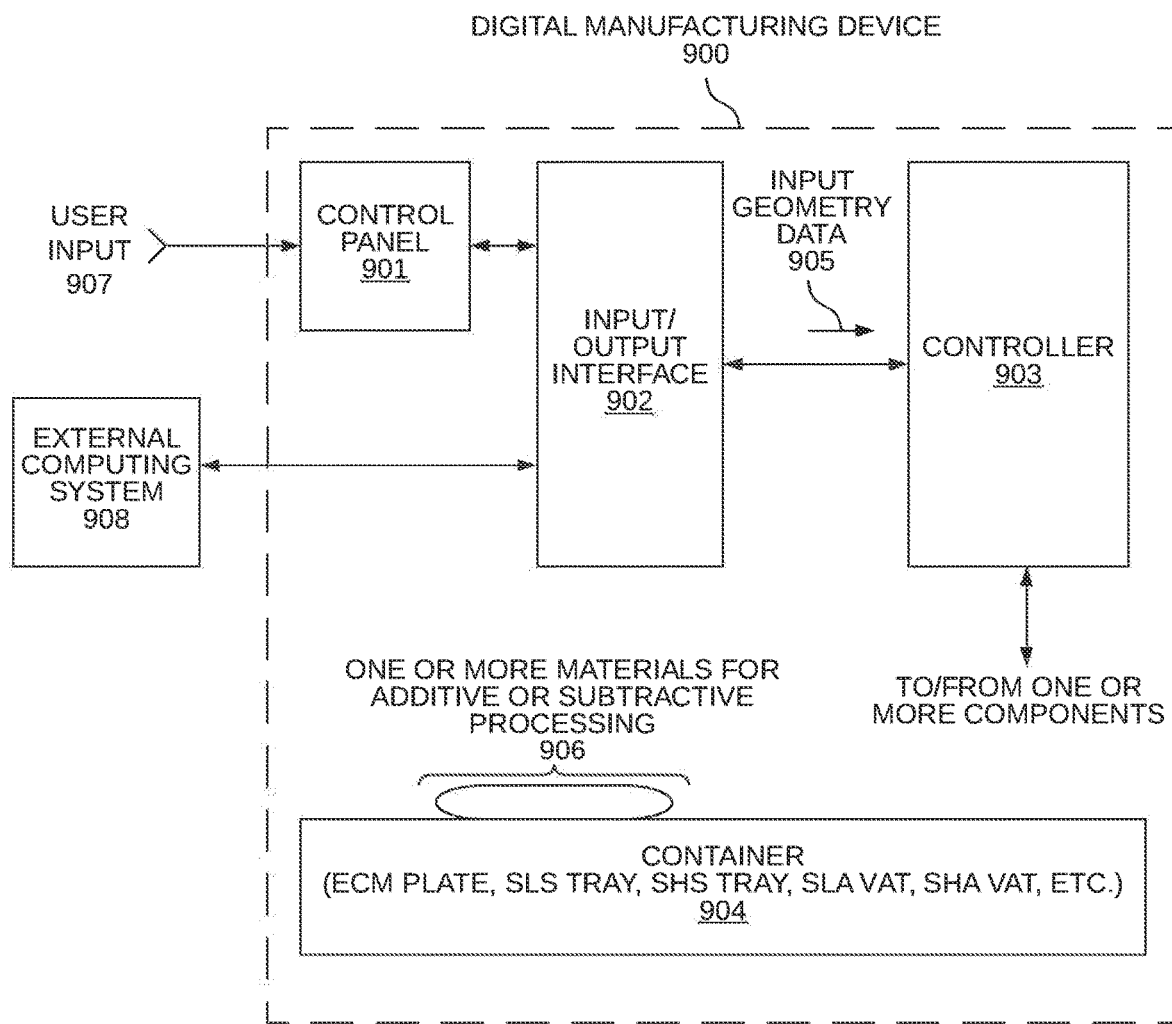
FIG. 21 is a diagram of a digital manufacturing device 900.

FIG. 21 is a diagram of a digital manufacturing device 900. The digital manufacturing device 900 is operable in accordance with various embodiments described above. The digital manufacturing device 900 includes a control panel 901, an input/output interface 902, a controller 903, and a container 904. In various embodiments, the container 904 is removable or non-removable. In one embodiment, the digital manufacturing device 900 is integrated within a single enclosure. In another embodiment, parts of the digital manufacturing device 900 are in separate enclosures and operate together to perform novel functions of the digital manufacturing device 900.

Input geometry data 905 is provided to the controller 903. The controller controls various components of the digital manufacturing device 900 to fabricate an object using materials 906 based on the input geometry data 905 in additive or subtractive operation modes in accordance with various techniques described above. In addition to input geometry data 905, control commands are supplied by user input 907 via the control panel 901 and/or via an external computing system 908. In another embodiment, the external computing system 908 is part of and internal to the digital manufacturing device 900. For example, a small onboard computer is embedded within the digital manufacturing device 900.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
 an enclosure that supports a container;
 a controller that receives input geometry data, wherein the controller is operable in an additive manufacturing mode and a subtractive manufacturing mode;
 a light box that outputs uniform irradiation;
 a Spatial Light Modulator (SLM) device, wherein the SLM device converts the uniform irradiation output by the light box into an image that is then projected through a transparent window of the container; and
 an opto electro heater array that converts the image generated by the SLM device into a thermal image applied to material disposed on the container in accordance with the input geometry data, wherein the opto electro heater array comprises an array of heater elements and an electrically conductive and optically transparent layer, and wherein irradiation output by the light box travels through the SLM, and onto the opto electro heater array.

2. The system of claim 1, wherein in the additive manufacturing mode, one or more selectable materials disposed on the container are combined to form an object based on the input geometry data, and wherein in the subtractive manufacturing mode, one or more selectable materials disposed on the container are subtracted from based on the input geometry data.

3. The system of claim 2, wherein the one or more selectable materials are selected from the group consisting of: resin, powder, liquid, or solid materials, and wherein the selectable materials are selected based on selected manufacturing modes.

4. The system of claim 1, wherein the container includes a recess that is fixed or adjustable that controls the thickness and uniformity of a material layer, wherein the container is selected from the group consisting of: a stereolithography (SLA) vat with or without a Spatial Light Modulator (SLM), a selective heater sintering (SHS) tray, a Marking (M) plate, and a selective heater apparatus (SHA) vat, and wherein container type is determined based on a selected manufacturing mode.

5. The system of claim 1, wherein the container is removable, wherein the container selected is based on selected manufacturing modes, and wherein the system further comprises:
 a sensor that detects a type of the container disposed within the enclosure; and
 an interface that receives input indicating a type of container disposed within the enclosure, wherein the input is supplied via an input panel or an external system.

6. The system of claim 1, wherein the system is configurable to process liquid resin materials, powder materials, or solid materials.

7. The system of claim 1, wherein the heater elements of the opto electro heater array output thermal energy to selectively fully fuse and partially fuse material disposed on the container, and wherein partially fused material provides a support structure during fabrication of an object.

8. The system of claim 1, further comprising:
 a build platform that is controlled to move as an object is fabricated on the container; and
 a recoater that distributes powder material throughout the container.

9. The system of claim 1, wherein the container includes a multi-layer window comprising:
 a transparent layer; and
 a non-transparent layer.

10. A system comprising:
 an enclosure that supports a container;

a controller that receives input geometry data, wherein the controller is operable in an additive manufacturing mode, a subtractive manufacturing mode, and a marking mode;

a light box that outputs uniform irradiation;

a Spatial Light Modulator (SLM) device, wherein the SLM device converts the uniform irradiation output by the light box into an image that is then projected through a transparent window of the container; and an opto electro heater array that converts the image generated by the SLM device into a thermal image applied to material disposed on the container in accordance with the input geometry data, wherein the opto electro heater array comprises an array of heater elements and an electrically conductive and optically transparent layer, and wherein irradiation output by the light box travels through the SLM, and onto the opto electro heater array.

11. The system of claim 10, wherein in the additive manufacturing mode, one or more selectable materials disposed on the container are combined to form an object based on the input geometry data, and wherein in the marking mode, one or more selectable materials disposed on the container are marked based on the input geometry data.

12. The system of claim 11, wherein the one or more selectable materials are selected from the group consisting of: resin, powder, liquid, or solid materials, and wherein the selectable materials are selected based on selected manufacturing modes.

13. The system of claim 10, wherein the container includes a recess that is fixed or adjustable that controls the thickness and uniformity of a material layer, wherein the container is selected from the group consisting of: a stereolithography (SLA) vat with or without a Spatial Light Modulator (SLM), a selective heater sintering (SHS) tray, a Marking (M) plate, and a selective heater apparatus (SHA) vat, and wherein container type is determined based on a selected manufacturing mode.

14. The system of claim 10, wherein the container is removable, wherein the container selected is based on selected manufacturing modes, and wherein the system further comprises:

a sensor that detects a type of the container disposed within the enclosure; and an interface that receives input indicating a type of container disposed within the enclosure, wherein the input is supplied via an input panel or an external system.

15. The system of claim 10, wherein the system is configurable to process liquid resin materials, powder materials, or solid materials.

16. The system of claim 10, wherein the heater elements of the opto electro heater array output thermal energy to selectively fully fuse and partially fuse material disposed on the container, and wherein partially fused material provides a support structure during fabrication of an object.

17. The system of claim 10, further comprising:

a build platform that is controlled to move as an object is fabricated on the container; and a recoater that distributes powder material throughout the container.

18. A system comprising:

an enclosure that supports a container, wherein the container includes a transparent window;

a controller that receives input geometry data, wherein the controller is operable in an additive manufacturing mode and a subtractive manufacturing mode;

a light box that outputs uniform irradiation;

a Spatial Light Modulator (SLM) device, wherein the SLM device converts the uniform irradiation output by the light box into an image that is then projected through a transparent window of the container; and an opto electro heater array that converts the image generated by the SLM device into a thermal image applied to material disposed on the container in accordance with the input geometry data, wherein the opto electro heater array comprises an array of heater elements and an electrically conductive and optically transparent layer, and wherein irradiation output by the light box travels through the SLM, and onto the opto electro heater array.

19. The system of claim 18, wherein the container includes a recess that is fixed or adjustable that controls the thickness and uniformity of a material layer.

20. The system of claim 18, wherein the system is configurable to process liquid resin materials, powder materials, or solid materials.

\* \* \* \* \*